(12) United States Patent
Espy et al.

(10) Patent No.: US 9,940,125 B1
(45) Date of Patent: Apr. 10, 2018

(54) GENERATING UPGRADE RECOMMENDATIONS FOR MODIFYING HETEROGENEOUS ELEMENTS OF INFORMATION TECHNOLOGY INFRASTRUCTURE

(71) Applicant: EMC IP Holding Company LLC, Hopkinton, MA (US)

(72) Inventors: James Espy, Andover, MA (US); Robert A. Lincourt, Jr., Pawtucket, RI (US); Susan Young, North Scituate, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 15/359,023

(22) Filed: Nov. 22, 2016

Related U.S. Application Data

(63) Continuation-in-part of application No. 15/221,074, filed on Jul. 27, 2016, which is a continuation-in-part of application No. 15/143,941, filed on May 2, 2016.

(51) Int. Cl.
  *G06F 9/445* (2018.01)
  *G06F 9/44* (2018.01)
  *G06F 17/30* (2006.01)

(52) U.S. Cl.
  CPC .......... *G06F 8/65* (2013.01); *G06F 8/71* (2013.01); *G06F 17/30864* (2013.01)

(58) Field of Classification Search
  None
  See application file for complete search history.

(56) References Cited

U.S. PATENT DOCUMENTS

| | | | |
|---|---|---|---|
| 8,566,838 B2* | 10/2013 | Sabin | G06F 9/5072 709/222 |
| 2013/0238785 A1* | 9/2013 | Hawk | G06F 9/5072 709/224 |

OTHER PUBLICATIONS

G. Lee et al., "Heterogeneity-Aware Resource Allocation and Scheduling in the Cloud," Proceedings of the 3rd USENIX Conference on the Hot Topics in Cloud Computing (HotCloud), Jun. 2011, 5 pages.

(Continued)

*Primary Examiner* — Chuck Kendall
(74) *Attorney, Agent, or Firm* — Ryan, Mason & Lewis, LLP

(57) ABSTRACT

A method includes selecting, for each of a plurality of application workloads, first and second configuration templates based on aligning an application workload specification template with first and second pluralities of configuration templates in respective first and second repositories. The first repository is obtained by filtering the second repository using a local platform catalog representing capabilities provided by information technology infrastructure. The method also includes scheduling the application workloads to run on the information technology infrastructure utilizing respective ones of the first configuration templates each comprising a set of heterogeneous elements of the information technology infrastructure. The method further includes generating one or more upgrade recommendations for modifying the information technology infrastructure based on analysis of the first and second configuration templates selected for respective ones of the application workloads, and transmitting the one or more upgrade recommendations over a network to an operator of the information technology infrastructure.

20 Claims, 9 Drawing Sheets

(56) References Cited

OTHER PUBLICATIONS

Steve Vinoski, "CORBA: Integrating Diverse Applications Within Distributed Heterogeneous Environments," IEEE Communications Magazine, Feb. 1997, pp. 46-55, vol. 35, No. 2.
C. Gregg et al., "Dynamic Heterogeneous Scheduling Decisions Using Historical Runtime Data," Workshop on Applications for Multi-and Many-Core Processors (A4MMC), Jun. 2011, 12 pages.
Harness, "New Generation Cloud Computing Platform: Heterogeneous Cloud for Increased Performance and Greater Utility," HARNESS Heterogeneous Cloud, White Paper, Dec. 2015, 17 pages.
S. Breβ et al., "Ocelot/HyPE: Optimized Data Processing on Heterogeneous Hardware," 40th International Conference on Very Large Data Bases (VLDB), Proceedings of the VLDB Endowment, Sep. 2014, pp. 1609-1612, vol. 7, No. 13, Hangzhou, China.
J. Shen et al., "Improving Application Performance by Efficiently Utilizing Heterogeneous Many-Core Platforms," 15th IEEE/ACM International Symposium on Cluster, Cloud and Grid Computing, May 2015, pp. 709-712, Shenzhen, China.
E. O'Neill et al., "SHEPARD: Scheduling on Heterogeneous Platforms Using Application Resource Demands," 22nd Euromicro International Conference on Parallel, Distributed, and Network-Based Processing, Feb. 2014, pp. 213-217, Torino, Italy.

\* cited by examiner

US 9,940,125 B1

GENERATING UPGRADE RECOMMENDATIONS FOR MODIFYING HETEROGENEOUS ELEMENTS OF INFORMATION TECHNOLOGY INFRASTRUCTURE

RELATED APPLICATION(S)

The present application is a continuation-in-part of U.S. patent application Ser. No. 15/221,074, filed on Jul. 27, 2016 and entitled "Monitoring Application Workloads Scheduled on Heterogeneous Elements of Information Technology Infrastructure," which is a continuation-in-part of U.S. patent application Ser. No. 15/143,941, filed on May 2, 2016 and entitled "Enhanced Application Request Based Scheduling on Heterogeneous Elements of Information Technology Infrastructure," the disclosures of which are incorporated by reference herein.

FIELD

The field relates generally to information technology infrastructure, and more particularly to scheduling workloads on information technology infrastructure.

BACKGROUND

Information technology infrastructure continues to grow, and may take various forms such as converged infrastructure. Converged infrastructure may be implemented by grouping information technology components or elements into an optimized computing package, including combining interdependencies between mobile computing, social media, cloud computing, information and analytics such as big data, Internet of Things (IoT), etc. The hardware elements and fabric of converged infrastructure, and more generally information technology infrastructure, are increasingly heterogeneous in function and specialization. Application diversity and workload size also continue to grow, and scheduling application workloads on heterogeneous elements of information technology infrastructure is an increasingly difficult task.

SUMMARY

Illustrative embodiments of the present invention provide techniques for generating upgrade recommendations for modifying heterogeneous elements of information technology infrastructure. The upgrade recommendations may be utilized to modify the information technology infrastructure to facilitate efficient use of resources in the information technology infrastructure as well as improvements in productivity.

In one embodiment, a method comprises selecting, for each of a plurality of application workloads, a first configuration template and a second configuration template, the first configuration template being selected based on aligning an application workload specification template with one of a first plurality of configuration templates in a first repository and the second configuration template being selected based on aligning the application workload specification template with one of a second plurality of configuration templates in a second repository, wherein the first repository is obtained by filtering the second repository using a local platform catalog representing capabilities provided by a plurality of heterogeneous elements of information technology infrastructure. The method also comprises scheduling the application workloads to run on the information technology infrastructure utilizing respective ones of the selected first configuration templates, each of the first configuration templates comprising a set of the plurality of heterogeneous elements of the information technology infrastructure. The method further comprises generating one or more upgrade recommendations for modifying the plurality of heterogeneous elements of the information technology infrastructure based on analysis of the first configuration templates and the second configuration templates selected for respective ones of the application workloads, and transmitting the one or more upgrade recommendations over a network to an operator of the information technology infrastructure. The plurality of heterogeneous elements of the information technology infrastructure are modified in accordance with at least one of the upgrade recommendations. The method is performed by at least one processing device comprising a processor coupled to a memory.

The processing device may be implemented, for example, in one or more network devices in a computer network, in a cloud computing platform, in a scheduler associated with information technology infrastructure, or in various other types of network systems associated with an enterprise.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
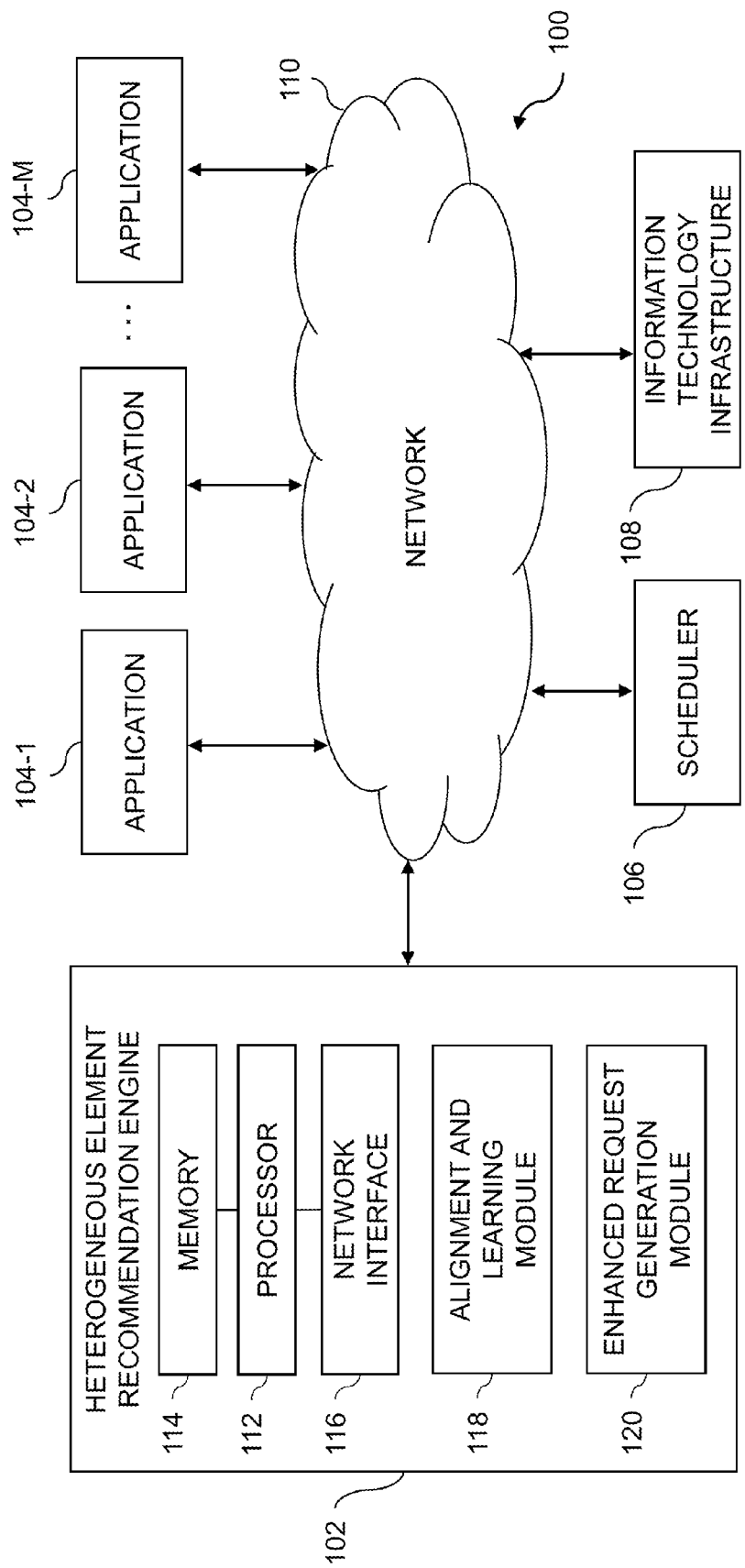
FIG. 1 is a block diagram of an information processing system for generating enhanced scheduling requests using a recommendation engine in an illustrative embodiment of the invention.

FIG. 1 shows a system 100 configured in accordance with an illustrative embodiment of the invention. The system 100 comprises a heterogeneous element recommendation engine (HERE) 102, a plurality of applications 104-1, 104-2, ..., 104-M, collectively referred to herein as applications 104, scheduler 106 and information technology (IT) infrastructure 108. HERE 102, applications 104, scheduler 106 and IT infrastructure 108 are connected via network 110.

While FIG. 1 shows elements such as HERE 102, applications 104 and scheduler 106 implemented external to IT infrastructure 108 and connected to the IT infrastructure 108 via network 110, embodiments are not limited to this arrangement. In some embodiments, one or more of HERE 102, applications 104 and scheduler 106 may be implemented at least in part internal to the IT infrastructure 108 or on a common processing platform. For example, the system 100 and/or IT infrastructure 108 may be a network of computing devices, a cloud computing platform, one or more data center(s), distributed virtual infrastructure, converged infrastructure, etc.

Although not explicitly shown in FIG. 1, one or more of applications 104 may be implemented on respective client devices coupled to network 110. In some embodiments, each of the applications is implemented on and/or otherwise run on or associated with a distinct client device. In other embodiments, a single client device may implement or run multiple ones of the applications 104. Such client devices may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices in some embodiments comprise respective computers associated with a particular company, organization or other enterprise. In addition, at least portions of the system may be referred to as comprising an enterprise system. Numerous other operating scenarios involving a wide variety of different types and arrangements of processing devices and networks are possible, as will be appreciated by those skilled in the art.

A client device implementing or running one or more of the applications 104, in some embodiments, may also implement HERE 102 and/or scheduler 106. HERE 102 and scheduler 106 may alternately be implemented on a separate processing device or devices.

The network 110 is assumed to comprise a global computer network such as the Internet, although other types of networks can be part of network 110, including a wide area network (WAN), a local area network (LAN), a satellite network, a telephone or cable network, a cellular network, a wireless network such as a WiFi or WiMAX network, or various portions or combinations of these and other types of networks. The network 110 in some embodiments therefore comprises combinations of multiple different types of networks each comprising processing devices configured to communicate using IP or other related communication protocols.

Portions of system 100, such as portions of IT infrastructure 108, may be implemented using one or more storage devices comprising, for example, storage products such as VNX® and Symmetrix VMAX®, both commercially available from EMC Corporation of Hopkinton, Mass. A variety of other storage products may be utilized to implement at least a portion of storage devices associated with system 100.

Although not explicitly shown in FIG. 1, one or more input-output devices such as keyboards, displays or other types of input-output devices may be used to support one or more user interfaces to HERE 102, applications 104, scheduler 106 and/or IT infrastructure 108, as well as to support communication between HERE 102, applications 104, scheduler 106 and IT infrastructure 108 and other related systems and devices not explicitly shown.

In the present embodiment, application requests, enhanced application requests, recommendations or other notifications generated by HERE 102, applications 104, scheduler 106 and/or IT infrastructure 108 may be provided over network 110 to a system administrator, IT manager, or other authorized personnel via one or more communication agents. Such communication agents may be implemented via the aforementioned client devices or by other computing or processing devices associated with a system administrator, IT manager or other authorized personnel. Such devices can illustratively comprise mobile telephones, laptop computers, tablet computers, desktop computers, or other types of computers or processing devices configured for communication over network 110 with HERE 102, applications 104, scheduler 106 and/or IT infrastructure 108. For example, a given communication agent may comprise a mobile telephone equipped with a mobile application configured to receive application requests, enhanced application requests, recommendations and/or other notifications from different elements of system 100 and to forward application requests, enhanced application requests, recommendations and/or other notifications to other elements of system 100.

It should be noted that a "communication agent" as the term is generally used herein may comprise an automated entity, such as a software entity running on a processing device. Accordingly, a communication agent need not be a human entity.

As shown in FIG. 1, HERE 102 is shown coupled to scheduler 106 and applications 104 over network 110. HERE 102, as will be described in further detail below, is configured to generate enhanced application requests for scheduling application workloads on heterogeneous elements of IT infrastructure 108.

Although shown as separate from scheduler 106 in FIG. 1, HERE 102 may in some embodiments be implemented at least in part internally to scheduler 106, or vice versa. Thus, HERE 102 and scheduler 106 may be implemented as a stand-alone server, set of servers or other type of system coupled to network 110. In addition, HERE 102 in some embodiments may be implemented at least in part by one or more of the applications 104 or by a client device implementing one or more of the applications 104.

HERE 102 in the FIG. 1 embodiments is assumed to be implemented using at least one processing device. Each such processing device generally comprises at least one processor and an associated memory, and implements one or more functional modules for controlling certain features of HERE 102.

More particularly, the HERE 102 in this embodiment comprises a processor 112 coupled to a memory 114 and a network interface 116.

The processor 112 illustratively comprises a microprocessor, a microcontroller, an application-specific integrated circuit (ASIC), a field-programmable gate array (FPGA) or other type of processing circuitry, as well as portions or combinations of such circuitry elements.

The memory 114 illustratively comprises random access memory (RAM), read-only memory (ROM) or other types of memory, in any combination. The memory 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 116 allows HERE 102 to communicate over network 110 with applications 104, scheduler 106 and IT infrastructure 108, and illustratively comprises one or more conventional transceivers.

The processor 112 further comprises an alignment and learning module 118 and enhanced request generation module 120. Enhanced request generation module 120 is configured to receive application requests comprising specifications for application workloads from applications 104. The enhanced request generation module 120 is configured to utilize the alignment and learning module 118 to select a given hardware configuration for a given application workload using one or more hardware configuration templates and information identifying a plurality of heterogeneous elements of IT infrastructure 108. The enhanced request generation module 120 is further configured to modify the application request to generate an enhanced application request specifying the given hardware configuration, and to provide the enhanced application request to scheduler 106. The scheduler 106 utilizes the enhanced application request to select from the plurality of heterogeneous elements of IT infrastructure 108 to schedule the given application workload.

Advantageously, HERE 102 is able to utilize alignment and learning module 118 and enhanced request generation module 120 to transform a given application request that includes hardware-agnostic service level objective (SLO) expressions for the given workload into a detailed job request statement, or enhanced application request, that permits scheduler 106 to schedule the given application workload on heterogeneous elements of IT infrastructure 108. Additional details regarding the alignment and learning module 118 and enhanced request generation module 120 will be described in further detail below with respect to FIGS. 2-5.

It is to be appreciated that the particular arrangement of HERE 102, applications 104, scheduler 106 and IT infrastructure 108 illustrated in the FIG. 1 embodiment is presented by way of example only, and alternative arrangements can be used in other embodiments. As discussed above, for example, HERE 102 and/or scheduler 106 may be implemented internal to one or more client devices implementing or running one or more of the applications 104. As another example, the functionality associated with the alignment and learning module 118 and enhanced request generation module 120 may be combined into one module, or separated across more than two modules with the multiple modules possibly being implemented with multiple distinct processors.

At least portions of the alignment and learning module 118 and the enhanced request generation module 120 may be implemented at least in part in the form of software that is stored in memory 114 and executed by processor 112.

It is to be understood that the particular set of elements shown in FIG. 1 for generation of enhanced application requests is presented by way of illustrative example only, and in other embodiments additional or alternative elements may be used. Thus, another embodiment may include additional or alternative systems, devices and other network entities, as well as different arrangements of modules and other components.

By way of example, portions of the system 100 including HERE 102 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™.

Other processing platforms may be used to implement portions of the system 100 such as HERE 102 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRack™ or Vblock® converged infrastructure commercially available from VCE, the Virtual Computing Environment Company, an EMC Federation Company.

As IT infrastructure elements, such as hardware and fabric, become more heterogeneous in function and specialization, scheduling application workloads becomes increasingly complicated and difficult. HERE 102 can provide numerous advantages by allowing scheduler 106 to optimally utilize heterogeneous elements of IT infrastructure 108 for an increasingly diverse set of agile-developed applications 104 and their corresponding workloads. HERE 102 can align application workload requests with a known set of effective hardware and fabric configurations while supplying corresponding detailed job descriptions to scheduler 106, resulting in a more efficient use of resources with corresponding improvements in system productivity.

Increasing productivity continues to be a goal or focus of enterprise and service provider data centers. In some embodiments, increased productivity is achieved via the optimal alignment of resources for applications 104 and their workloads in an agile and automated fashion.

The diversity of applications and workload size are growing, enabled in part by attributes of modern IT infrastructure such as data centers and converged infrastructure. As more hardware options become available, such as various different types of processors, memory, fabrics, etc., scheduling such diverse applications workloads is more difficult. While some scheduling functions operate well when presented with a relatively homogeneous set of CPU cores, memory capacities and specific requests for use, scheduling functions are challenged when applications are less explicit about hardware requirements and the available hardware includes a wider range of possibilities.

HERE 102 can work in conjunction with scheduler 106 to effectively align available heterogeneous resources or elements of IT infrastructure 108 against requests from a diverse set of applications 104 for different application workloads to improve utilization and efficiency of IT infrastructure 108 resulting in lower IT total cost of ownership (TCO) and higher overall productivity. HERE 102 can provide a number of functions, including alignment, re-alignment, learning and upgrade.

The alignment function of HERE 102 can be used to generate a hardware element and/or topology recommendation, or more generally a hardware configuration, for a requesting application and workload using a configuration knowledge base and a local element catalog, or more generally using one or more hardware configuration templates and information identifying a plurality of heterogeneous elements of IT infrastructure 108.

The re-alignment function of HERE 102 can be used for exception handling and improved opportunities. For example, exception handling may be used when the available or overall capacity of IT infrastructure 108 is unable to fulfill an application request at a particular time. Improved opportunity may handle situations in which better hardware options become available as an application workload is running.

The learning function of HERE 102 implements analytics capabilities facilitating additions to a knowledge based utilized by HERE 102. Additions to the knowledge base may be made over time through experience scheduling application workloads on IT infrastructure 108 as well as information regarding scheduling application workloads on different IT infrastructures.

Additional details regarding re-alignment and analytics functionality of HERE 102 will be described in further detail below with respect to FIGS. 6 and 7.

The upgrade function of HERE 102 can observe applications 104 and application workload behavior over time to recommend upgrades to IT infrastructure 108.

Additional details regarding upgrade functionality of HERE 102 will be described in further detail below with respect to FIGS. 8 and 9.

There continues to be a need to measurably improve system productivity in the form of increasing useful output and reducing TCO. Measurable improvement may come from reduced TCO via improved platform utilization at the same or better performance levels.

Agile development methods produce ever widening and newer classes of applications and corresponding workloads. Application requests are increasingly described in abstract terms rather than a specific job statement such as "Please provide N cores and M GB of memory." Schedulers, however, often require specific job statements rather than application requests in abstract terms. As a wider range of hardware elements becomes available, the specific and sometimes unique attributes of such diverse hardware can align more effectively with particular application classes and workloads relative to a pool of homogeneous hardware elements. Without added detail, schedulers do not know how to match an increasingly heterogeneous element set to application requests. HERE 102, as described herein, may be utilized to at least partially solve one or more of these and other drawbacks associated with conventional schedulers.

Figure 2:
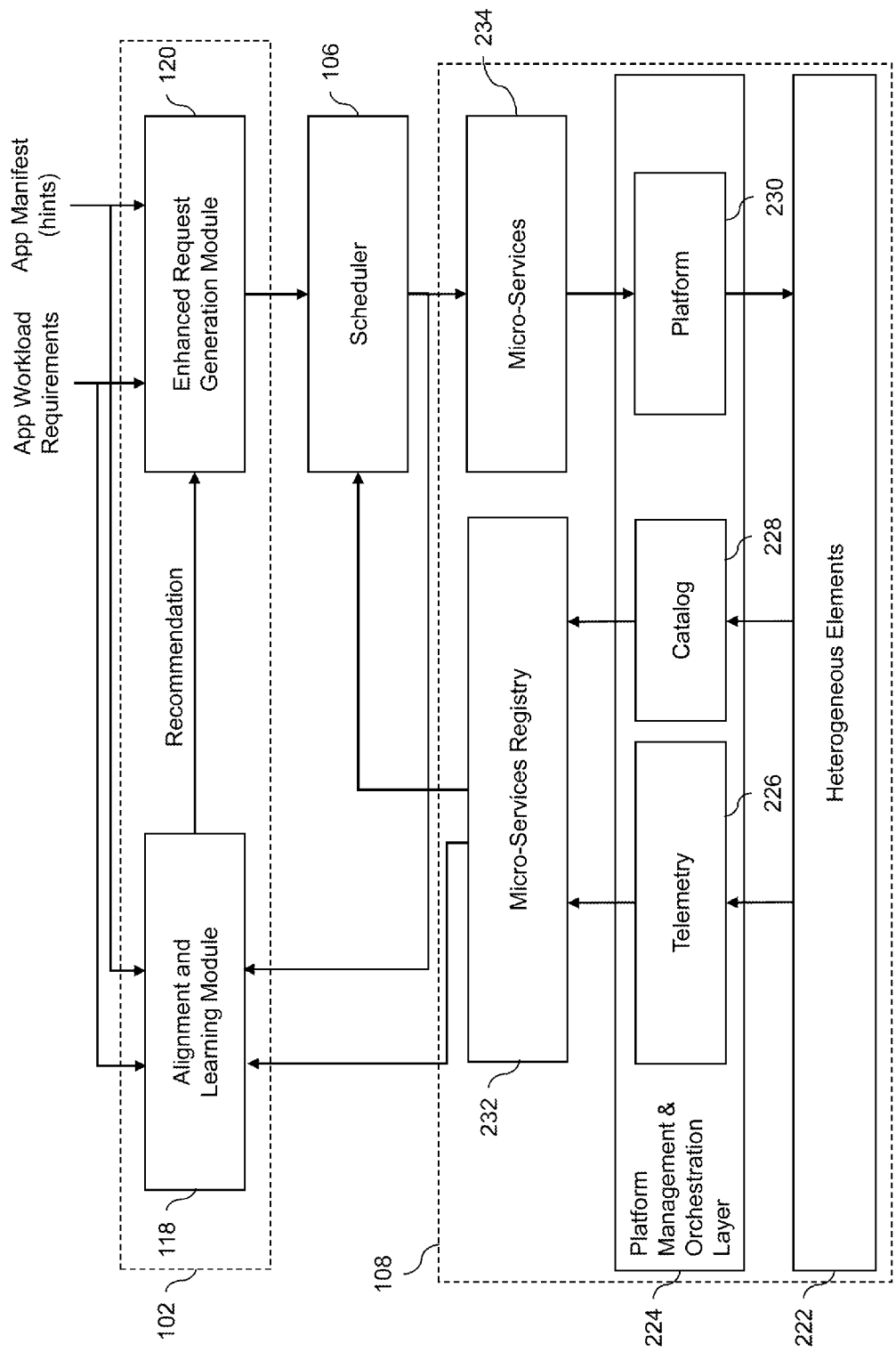
FIG. 2 is a detailed view of portions of the FIG. 1 system in an illustrative embodiment.

FIG. 2 shows a detailed view of portions of the FIG. 1 system, where like reference numerals refer to similar elements. HERE 102 includes alignment and learning module 118 and enhanced request generation module 120. IT infrastructure 108 includes heterogeneous elements 222, a platform management and orchestration (M&O) layer 224 including telemetry 226, catalog 228 and platform 230, and micro-services registry 232 and micro-services 234.

Application requests are directed to scheduler 106 from applications (not shown in FIG. 2 for clarity), and may include application workload requirements as well as an application manifest or hints relating to the application request. HERE 102 may be configured so as to receive the application request and provide an enhanced application request to the scheduler 106. In some embodiments, HERE 102 may intercept application requests that are directed to the scheduler 106 in a manner that is transparent to the applications and scheduler 106. In other embodiments, applications direct their requests to the HERE 102. In still other embodiments, scheduler 106 may receive application requests, and send application requests to the HERE 102 for processing on an as-needed basis. As an example, the scheduler 106 may determine whether a particular application request contains a detailed declarative job statement that the scheduler 106 is capable of handling on its own, or whether the application request is more abstract and cannot be handled by the scheduler 106 on its own.

HERE 102 parses and interprets the application workload requirements and any detailed manifest information, and compares this information to a learned knowledge base repository of configurations based on an existing platform catalog to determine a recommended hardware configuration. The recommended hardware configuration is combined with the original application request to form an enhanced application request sent to scheduler 106. Whereas the original application request may be abstracted SLO expressions not usable by the scheduler 106, the enhanced application request may be a finer grained declarative job statement which the scheduler 106 may use to fulfill the application request. As a result, scheduler 106 is able to utilize IT infrastructure 108 which includes heterogeneous elements 222. In some embodiments, this results in improved hardware element to application alignment and utilization while minimizing impact on scheduler 106 and catalog and telemetry functions described below.

IT infrastructure 108, as discussed above, includes heterogeneous elements 222 as well as a platform M&O layer 224 including telemetry 226, catalog 228 and platform 230 functions, as well as micro-services registry 232 and micro-services 234. The heterogeneous elements 222 include various hardware and fabrics of different types. Platform M&O layer 224 provides infrastructure intelligence for automating discovery, description, provisioning and programming for heterogeneous elements 222. Platform M&O layer 224 may be implemented via OnRack® or RackHD™, commercially available from EMC Corporation of Hopkinton, Mass.

Platform M&O layer 224 provides telemetry 226, catalog 228 and platform 230. Telemetry 226 functions for receiving feedback from heterogeneous elements 222 including their state and related measurements. Telemetry 226 may use various monitoring tools, including active performance monitors, OnRack®, etc. Catalog 228 functions as a registry of the heterogeneous elements 222, including their capabilities and capacities. Platform 230 includes units composed from basic ones of the heterogeneous elements 222. For example, a compute node including processor, memory and Input/Output (I/O) elements may be considered a unit in platform 230.

The IT infrastructure 108 also includes micro-services registry 232 and micro-services 234. Micro-services are a level of abstraction above more physically-oriented platform M&O items. Micro-services 234 include units of micro-services such as a GPU. Micro-services registry 232 functions similar to catalog 228, but as a registry of micro-services rather than as a registry of the heterogeneous elements 222. Micro-services registry 232 may include a catalog of observable states and persistent information. Micro-services 234 may include existing and composed micro-services.

Figure 3:
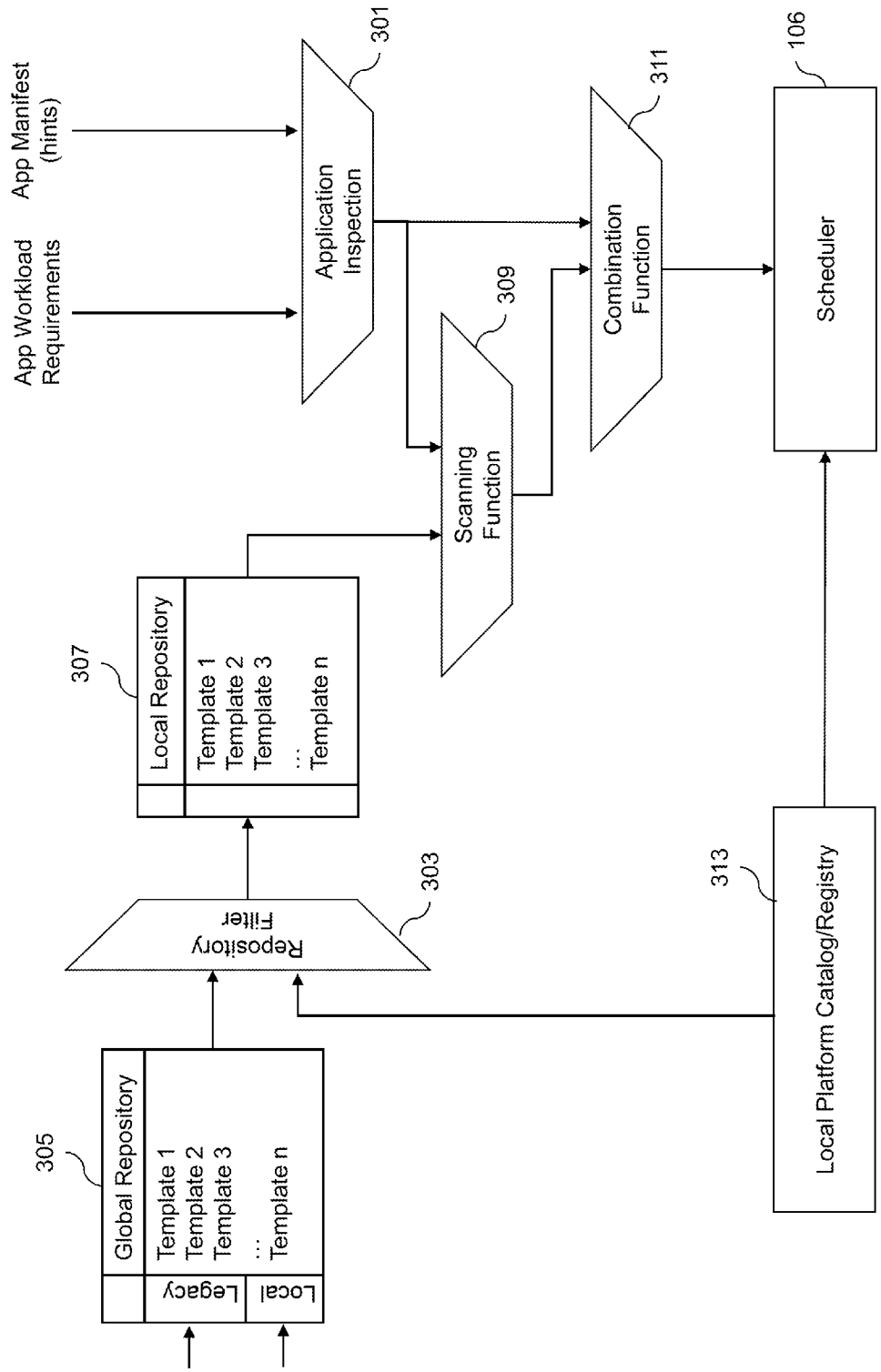
FIG. 3 is a flow diagram illustrating an alignment function of a recommendation engine in an illustrative embodiment.

FIG. 3 is a functional flow diagram of the alignment function of HERE 102. FIG. 3 shows application inspection function 301, repository filter function 303, global repository 305, local repository 307, scanning function 309, combination function 311 and local platform catalog/registry 313. The elements 301, 303, 307, 309 and 311 may be implemented by HERE 102. The local platform catalog/registry 313 represents a combination of the telemetry 226, catalog 228, platform 230 and micro-services registry 232 of FIG. 2, and represents knowledge of locally available heterogeneous elements, platforms and micro-services.

Applicant inspection function 301 parses and interprets the application request, including application workload requirements and any detailed application manifest information or hints. The application inspection function 301 provides a view of the application request in a format similar to the template entries in local repository 307.

Repository filter function 303 filters global repository 305 to generate local repository 307. The global repository 305 represents a combination of all conceived and learned configurations. This is reflected in FIG. 3 via the boxes for legacy (previously-conceived configurations or templates) and local (learned configurations or templates). The local repository 307 is a version of the global repository 305 filtered using information from local platform catalog/registry 313. The local repository 307 is thus representative of the usable capabilities of the IT infrastructure. Local repository 307 is a knowledge base that is populated with configurations aligned to particular known application classes and workloads. Such configurations are also referred to herein as application workload templates. As shown in FIG. 3, local repository 307 includes templates 1 through n. Each template or entry in local repository 307 may include specialized topologies of hardware elements and fabric for particular known applications, such as scale-out ARM CPUs that fit better with throughput storage-oriented applications and workloads, x86 CPUs that fit better with computationally expensive workloads, etc. The local repository 307 can start small and grow over time via learning with external feeds or local analytics and learning.

Scanning function 309 attempts to align the application workload specification template generated by application inspection function 301 with one or more entries in the local repository 307. Aligning or matching the application workload specification template with one or more entries in the local repository 307 may include finding a best fit match, as there may be unknown or missing attributes in the application workload specification template and/or in one or more entries of the local repository 307. A match results in a recommendation that is output to combination function 311. The combination function 311 combines the matched template or hardware configuration from the local repository 307 with the application workload specification template to generate an enhanced application request, which is a detailed job request statement provided to scheduler 106.

The scanning function 309 does not necessarily need to find a best fit match for all application requests. Attributes such as application longevity and workload size may impact the resources or effort used by the scanning function 309. Applications of shorter lifespan or smaller workloads may not require best effort alignments.

In some embodiments, the scanning function 309 may find the best fit match or hardware configuration for an application workload so as to optimize that particular application workload. In other embodiments, however, the best first match may be based on improving performance or utilization of resources for a group of application workloads collectively. Thus, the best fit match need not necessarily be the optimal match for a single application workload—the best fit match may be one which leads to net productivity improvement for a group of application workloads.

Figure 4:
FIG. 4 illustrates possible outcomes of an alignment function of a recommendation engine in an illustrative embodiment.

The alignment function of HERE 102 has several possible outcomes. FIG. 4 illustrates possible outcomes 400 of the alignment function of HERE 102 in some embodiments. In the FIG. 4 embodiment, the outcome is: (1) fulfilled; (2) unfulfilled but with sufficient overall capacity; or (3) unfulfilled with insufficient overall capacity. If the outcome is (1), there are sufficient and available resources such as hardware elements and fabric to schedule a given application workload using a selected hardware configuration. The application request is thus successfully scheduled and no further alignment function action is needed. This is the presumed result of the alignment function in some embodiments.

If the outcome is (2), then there are unavailable resources at present to schedule the given application workload with the selected hardware configuration. The resources may be unavailable because they are in use by another application workload, are failed or awaiting service, etc. The resources could become available at a later time, and thus there are several re-alignment options. One re-alignment option is to delay fulfillment of the application request until the resources in the selected hardware configuration are available. Another re-alignment option is to recommend a modified hardware configuration for the given application workload which utilizes available resources. The modified hardware configuration may, in some cases, be generated by reducing one or more specifications or requirements of the application request. Yet another re-alignment option is to generate recommendations such that the application request may be fulfilled at the current time. The recommendations may include recommendations to upgrade hardware of the IT infrastructure, to reclaim unused or underutilized resources in use by other application workloads, etc. Recommendations may also include obtaining feedback from the source of the application request regarding how to modify requirements of the application request to modify the selected hardware configuration.

If the outcome is (3), there are not enough resources in the platform or IT infrastructure at the present time to fulfill the application request using the selected hardware configuration. Thus, waiting is not a re-alignment option as the request cannot be fulfilled even with resources that are currently unavailable. Other re-alignment options are still available, including recommending modified hardware configurations for the given application workload or generating recommendations as discussed above with respect to outcome (2).

In outcomes (2) and (3), re-alignment functionality may also involve monitoring the IT infrastructure after an application request is scheduled with the modified hardware configuration. In such cases, monitoring may include determining whether, at some point after scheduling the application request using the modified hardware configuration, it is possible to move the application workload corresponding to the application request to a preferred hardware configuration. Re-alignment functionality may also be performed in the case of outcome (1). For example, a repository of hardware configurations may be updated over time and thus a new preferred hardware configuration may be found for an application workload scheduled in the case of outcome (1). These and other examples will be discussed in further detail below with respect to FIGS. 6 and 7.

HERE 102 provides several advantages, including the above-described alignment function providing a unique service of aligning increasingly diverse and abstract application requests with an increasingly heterogeneous set of elements or resources of IT infrastructure 108 including hardware elements and fabric topologies. HERE 102 also provides additional advantages via the re-alignment function, which provides for exception handling in certain outcomes of the alignment function as discussed above. HERE 102 also includes learning functions for knowledge base growth and upgrade functions to provide recommendations. Additional details regarding learning functions will be described in further detail below with respect to FIGS. 6 and 7. Recommendations may be generated by monitoring performance of application workloads, e.g., "Your system may operate more efficiently with the following added resources . . . " or may be based on exception handling in the re-alignment function, e.g., "To fulfill the application request with the selected hardware configuration, additional resources are needed." Additional details regarding upgrade functions will be described in further detail below with respect to FIGS. 8 and 9. Advantageously, HERE 102 can operate as an independent or adjacent function relative to scheduler 106. Thus, HERE 102 can be used in systems without requiring any particular or major updates to an otherwise conventional scheduler.

Figure 5:
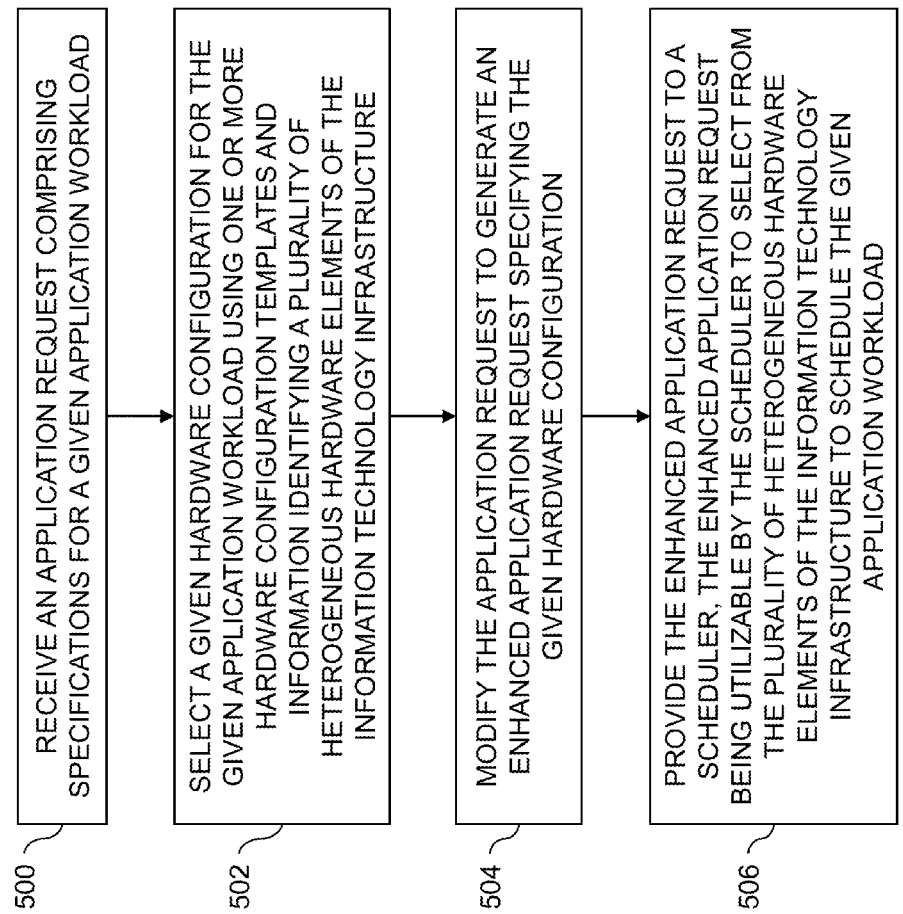
FIG. 5 is a flow diagram illustrating a process for generating enhanced scheduling requests in an illustrative embodiment.

An exemplary process for generation of enhanced application requests will now be described in more detail with reference to the flow diagram of FIG. 5. It is to be understood that this particular process is only an example, and that additional or alternative processes for generating enhanced application requests can be carried out in other embodiments.

In this embodiment, the process includes steps 500 through 506. These steps are assumed to be performed by the processor 112 of HERE 102 utilizing alignment and learning module 118 and enhanced request generation module 120. The process begins with step 500, receiving an application request that comprises specification for a given application workload. The application request may be received at HERE 102 from one of applications 104. In some embodiments, HERE 102 is configured so as to intercept an application request sent from one of applications 104 and directed to the scheduler 106. HERE 102 can then modify the application request as detailed herein and provide an enhanced application request to the scheduler 106 in a manner that is transparent to one or more of the applications 104 and/or scheduler 106.

The application request received in step 500 may include hardware-agnostic SLOs. As discussed above, scheduling functions can operate well when a scheduler is presented with a homogeneous set of hardware elements, such as CPU cores and memory capacities for specific requests for use. Scheduling functions are challenged, however, when applications 104 are less explicit about the hardware requirements needed for a particular workload. Scheduling functions are also challenged when the available hardware resources, such as elements of IT infrastructure 108, are heterogeneous.

For example, heterogeneous elements of the IT infrastructure 108 may include two or more different types of processors, but the hardware-agnostic SLOs of the application request received in step 500 may not specify a particular type of processor to be used for the given application workload. Different types of processors include, by way of example, processors with different central processing unit (CPU) architectures (e.g., x86, ARM, OpenPOWER, etc.) processors with different instruction set architectures (ISAs), processors with specialized function off-load capabilities, graphics processing units (GPUs) including general purpose GPUs (GPGPUs), system-on-chip (SOC) integrated circuits, field programmable gate arrays (FPGAs), etc.

Heterogeneous elements of the IT infrastructure 108 may also include different fabric topologies, and the application request received in step 500 may not specify a particular type of fabric topology to use for a given workload.

Heterogeneous elements of the IT infrastructure 108 may also include various different types of storage, and the application request received in step 500 may not specify a particular type of storage to use for a given workload. Different types of storage include, by way of example, byte addressable non-volatile memory (NVM), high capacity flash, hard disk drives, network attached storage (NAS), etc.

Some classes of applications describe workload requirements in abstract terms such as hardware-agnostic SLOs instead of a more specific job statement such as "Provide N cores and M GB of memory." Scheduler 106, however, may require such a specific job statement, and thus HERE 102 can receive the application request comprising hardware-agnostic SLOs and transform it into an enhanced application request forming a detailed job request statement for use by scheduler 106. Receiving the application request in step 500 may include parsing and interpreting the hardware-agnostic SLOs to generate an application workload specification template in a format compatible with entries in a local repository comprising one or more hardware configuration templates as discussed above with respect to FIGS. 2 and 3.

In step 502, a given hardware configuration is selected for the given application workload using one or more hardware configuration templates and information identifying a plurality of heterogeneous elements of IT infrastructure 108. In some embodiments, selecting the given hardware configuration is based on performance requirements associated with the given application workload. For example, the given hardware configuration may be selected so as to optimize performance of the given application workload individually.

In other embodiments, selecting the given hardware configuration may be based on performance requirements associated with the given application workload and one or more other application workloads that utilize IT infrastructure 108. For example, the given hardware configuration for the given application workload may be selected so as to increase net productivity over multiple different application workloads. It is to be appreciated that while FIG. 5 and various embodiments are described herein with respect to generating an enhanced application request for a single application workload, embodiments are not so limited. The FIG. 5 process may be repeated so as to generate enhanced application requests for all or some subset of application requests that are directed to or otherwise utilize IT infrastructure 108.

As mentioned above, hardware configuration templates may be obtained from a local repository. Each hardware configuration template can be associated with one or more applications classes and/or one or more workload types. The local repository may be a filtered version of a global repository. The global repository may include all previously used hardware configurations as well as learned hardware configurations. The local repository may filter the global repository using a local platform catalog that represents the capabilities of IT infrastructure 108. Selecting the given hardware configuration in step 502 may include aligning the given application workload specification template generated by parsing the application request with a given entry in the local repository that corresponds to the given hardware configuration.

The process continues with modifying the application request to generate an enhanced application request specifying the given hardware configuration in step 504. Step 504 may include combining hardware-agnostic SLOs with the given hardware configuration to generate a job request statement. The enhanced application request is provided to a scheduler 106 in step 506, where the enhanced application request is utilizable by the scheduler 106 to select from the plurality of heterogeneous elements of IT infrastructure 108 to schedule the given application workload.

As discussed above with respect to FIG. 4, there are a number of possible outcomes for selecting the given hardware configuration in step 502 and modifying the application request to generate the enhanced application request in step 504. In some cases, the IT infrastructure 108 has sufficient available capacity to fulfill the application request at a given time using the given hardware configuration selected in step 502. In such cases, steps 504 and 506 proceed without alteration. If the IT infrastructure 108 has either insufficient available capacity at the given time, or has insufficient overall capacity, processing in step 502, 504 and 506 may be altered as discussed below.

For example, if it is determined that the IT infrastructure 108 has sufficient overall capacity to fulfill the application request but has insufficient available capacity at the given time, a number of remedial steps may be taken. In some embodiments, HERE 102 may generate the enhanced application request as normal in step 504 but delay providing the enhanced application request to the scheduler 106 until the IT infrastructure 108 has sufficient available capacity to fulfill the application request using the given hardware configuration selected in step 502. In other embodiments, the given hardware configuration selected in step 502 may be modified such that the IT infrastructure 108 has sufficient available capacity at the given time to fulfill the application request using the modified hardware configuration. This may involve reducing one or more specifications or requirements of the given application workload, possibly by receiving feedback from one of applications 104 using the aforementioned communication agents. In still other embodiments, a recommendation may be generated for upgrading IT infrastructure 108 such that the IT infrastructure 108 would have sufficient available capacity at the given time to fulfill the application request with the given hardware configuration selected in step 502. The recommendation may be provided via one or more of the aforementioned communication agents to one or more of applications 104, a system administrator, owner or other individual or device associated with IT infrastructure 108, etc. The recommendation may be for adding hardware elements to the IT infrastructure 108, or possibly to free up existing hardware elements by pausing one or more lower priority application workloads, by offering incentives to delay scheduling other application workloads, to reclaim underutilized resources from other application workloads, etc.

If it is determined that the IT infrastructure 108 has insufficient overall capacity to fulfill the application request, a number of remedial steps may be taken. In some embodiments, the given hardware configuration selected in step 502 may be modified such that the IT infrastructure has sufficient overall capacity to fulfill the application request using the modified hardware configuration and/or sufficient available capacity to fulfill the application request at the given time using the modified hardware configuration. This may involve reducing one or more specifications or requirements of the given application workload, possibly by receiving feedback from one of applications 104 using the aforementioned communication agents. In other embodiments, a recommendation may be generated for upgrading IT infrastructure 108 such that the IT infrastructure 108 would have sufficient overall capacity to fulfill the application request with the given hardware configuration selected in step 502 and/or sufficient available capacity to fulfill the application request at the given time with the given hardware configuration selected in step 502. The recommendation may be communicated via one or more of the aforementioned communication agents to one or more of applications 104, a system administrator, owner or other individual or device associated with IT infrastructure 108, etc.

In some embodiments, the system 100 may monitor performance of the given application workload and one or more other application workloads running on IT infrastructure 108. Performance monitoring may be performed at least in part by HERE 102, applications 104 and/or scheduler 106. Performance information may be utilized to generate recommendations for upgrading hardware and/or software elements of the information technology infrastructure. Such recommendations may be delivered via the aforementioned communication agents to one or more of applications 104, a system administrator, owner or other individual or device associated with IT infrastructure 108, etc. Additional details regarding upgrade functionality will be discussed in further detail below with respect to FIGS. 8 and 9. Performance information may also or alternatively be used to generate new hardware configuration templates, or to modify existing hardware configuration templates in one or both of the global repository and local repository. Performance information may further or alternatively be used to generate modified hardware configuration recommendation(s) for use in fulfilling the application request. For example, if performance information indicates that elements of the IT infrastructure 108 in the given hardware configuration selected in step 502 are over- or under-utilized, the modified hardware configuration recommendation(s) may specify alternative hardware elements to utilize for the given application workload. As another example, performance information may indicate that available capacity has increased while the given application workload is running relative to when the given application workload was first scheduled, and better or more hardware elements may be allocated to the given application workload. Additional details regarding monitoring, including re-alignment and learning functionality, will be discussed in further detail below with respect to FIGS. 6 and 7.

HERE 102, as discussed above, may provide various runtime-oriented functionality, including re-alignment and learning or analytics functionality. Application workloads may be re-aligned for various reasons. As discussed above with respect to FIG. 4, an original recommendation configuration, also referred to herein as a primary or preferred configuration, may be unfulfilled if the resources required for the original recommendation configuration is not initially available in whole or in part. The outcomes (2) and (3) discussed above with respect to FIG. 4 are examples of cases in which the original recommendation configuration may be unfulfilled. If the preferred hardware configuration or original recommendation configuration becomes available at a later time, and it is still deemed beneficial, the application workload may be transitioned from the scheduled hardware configuration to the preferred hardware configuration.

HERE 102 can also provide learning and analytics functionality in updating the global repository 305 and/or the local repository 307 by adding experiential entries for hardware configuration templates. The global repository 305, for example, may be updated based on external updates, such as hardware configuration templates learned from other IT infrastructure. The local repository 307, for example, may be updated based on local analytics/learned runtime behavior, changes to the IT infrastructure 108, etc.

In some embodiments, the assumed outcome of the alignment function of HERE 102 is that the primary recommendation is satisfied by a corresponding scheduling mechanism such as scheduler 106, e.g., outcome (1) in FIG. 4 wherein the necessary resources are available and provisioned at the time of submission. In some cases, such as outcomes (2) and (3) in FIG. 4, it is possible that the resources are not available at the time of submission for various reasons (e.g., the resources are in use or in a failed state). In some cases, the scheduler 106 may wait for the resources to become available at a later time. This, however, may impact SLOs. Thus, as described above with respect to FIG. 4, in outcomes (2) and (3) the HERE 102 may select or realign to a secondary, tertiary or other alternate recommendation by using resources that are available.

While an application workload is running on the alternate recommendation, the resources for the primary or original recommended configuration may subsequently become available. Thus, a re-alignment function of HERE 102 can re-align the application workload to the primary or preferred hardware configuration. Re-alignment may be subject to one or more policies, such as whether there is significant run time remaining for the application workload, contention between scheduled application workloads, etc.

Over time, various new application workloads may be created, and existing heterogeneous elements of the IT infrastructure 108 may be upgraded or enhanced to include new elements such as more diverse functionality, quantities, capacities, etc. Repository contents of the global repository 305 and/or local repository 307 may become stale or could otherwise miss opportunities for improved alignment if not updated to reflect these and other changes to the IT infrastructure 108 as well as to reflect new information regarding types or classes of applications and their associated workloads. New hardware configuration templates can thus be learned and used to supplement or update hardware configuration templates in one or both of the global repository 305 and local repository 307.

Figure 6:
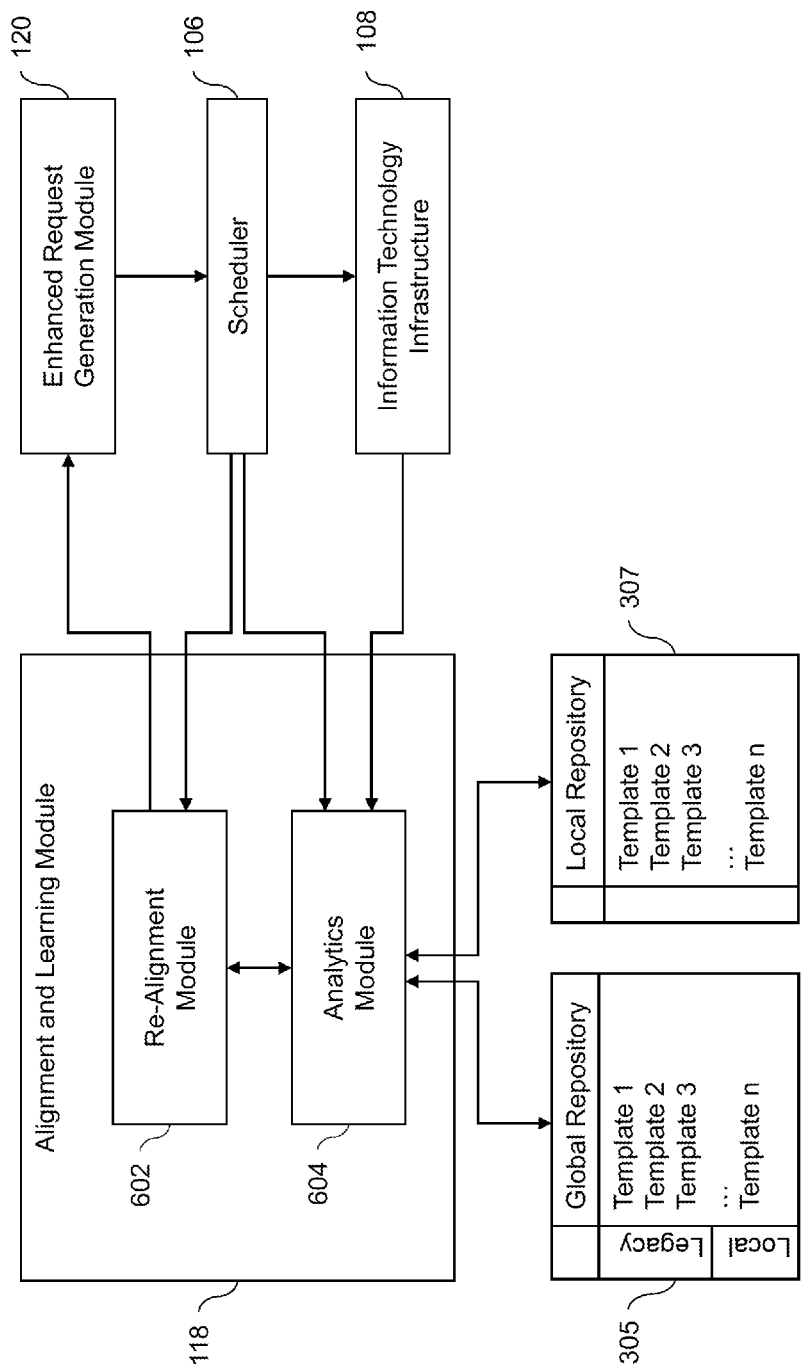
FIG. 6 is a detailed view of portions of the system shown and described in FIGS. 1-3 in an illustrative embodiment.
Figure 7:
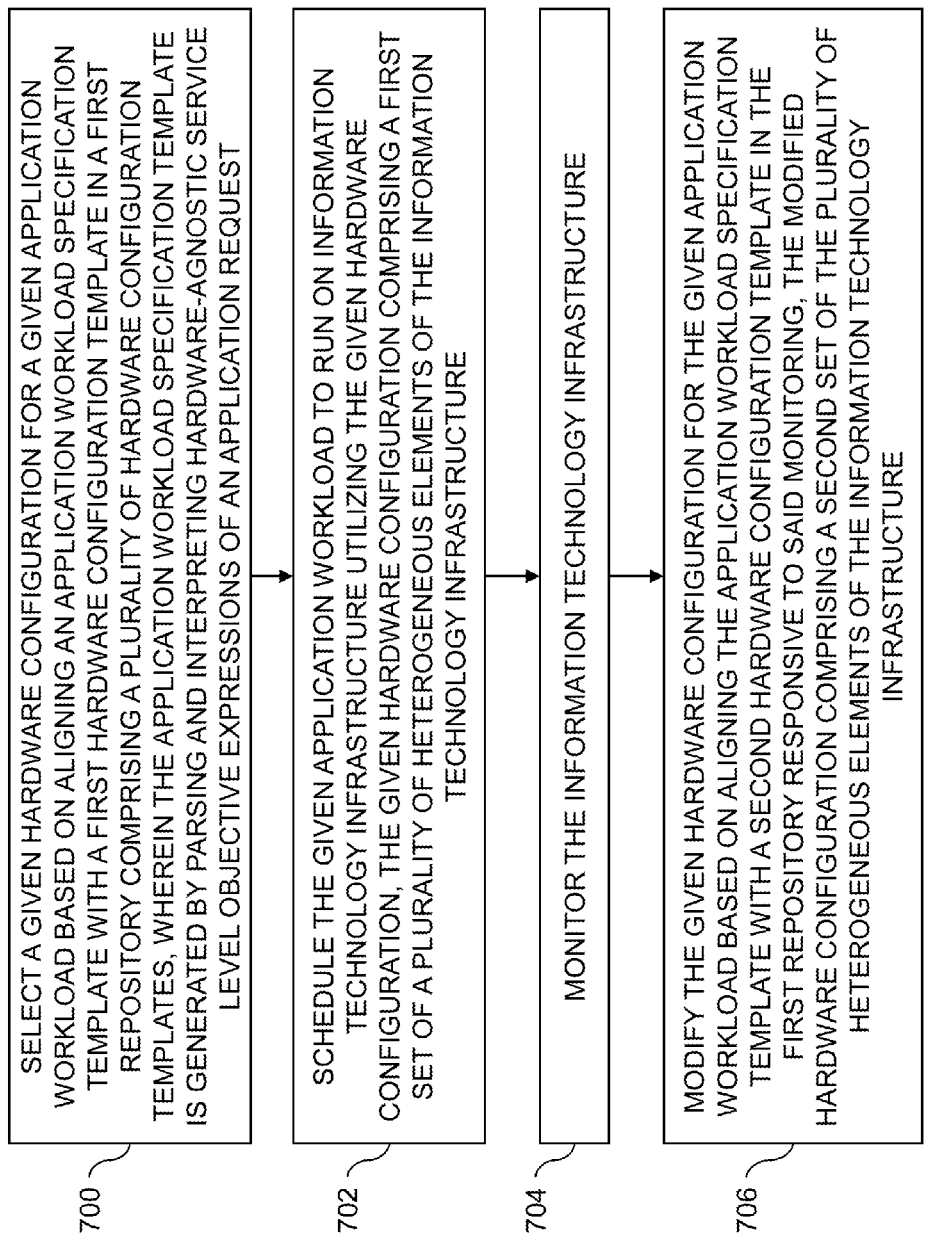
FIG. 7 is a flow diagram illustrating monitoring functions of a recommendation engine in an illustrative embodiment.

FIG. 6 shows a detailed view of portions of the system shown and described above with respect to FIGS. 1-3. In FIG. 6, certain elements are shown connected by double-edged arrows and others are shown as connected by single-edged arrows. The use of such single-edged arrow connectors in these and other figures is for clarity of illustration, and not to indicate that communication between such elements is restricted to unidirectional communication unless specifically noted otherwise herein. As shown, alignment and learning module 118 includes a re-alignment module 602 and an analytics module 604. The re-alignment module 602 provides re-alignment functionality. Re-alignment module 602, in some embodiments, operates during runtime of application workloads, and monitors submission of application requests by the enhanced request generation module 120 to scheduler 106, as well as scheduling of enhanced application requests by the scheduler 106 on IT infrastructure 108.

If the primary alignment recommendation selected by alignment and learning module 118 cannot be fulfilled, HERE 102 provides the option of searching the local repository 307 for an alternate hardware configuration by matching the application workload specification for a given application request to another hardware configuration template in the local repository 307. Selection of the alternate hardware configuration, in some embodiments, may be facilitated by a bidding-oriented scheduler implemented by scheduler 106 or HERE 102. The Apache Mesos™ system, suitably modified to function as described herein, may provide such bidding-oriented scheduling.

If an application workload is running on an alternative configuration, which may not be an ideal configuration relative to the preferred hardware configuration, and the primary or preferred hardware configuration resources become available, HERE 102 via re-alignment module 602 can provide the option of switching the alternate hardware configuration to the preferred hardware configuration. This switching may be policy-based, such as using policies relating to contention between application workloads scheduled on the IT infrastructure 108, remaining lifetime of an application or application workload, etc.

In some embodiments, the policies are used to supply hints or direct statements of the hardware that is required, preferred or otherwise recommended for a given application workload. As an example, a given application workload may run more efficiently if a graphics processing unit (GPU) is used, but can run or work without using a GPU. At initial deployment of the given application workload, there may be no GPUs included or available in the heterogeneous elements 222 of the IT infrastructure 108. If a new server that contains one or more GPUs is installed or otherwise added to the heterogeneous elements 222 of IT infrastructure 108, or if previously unavailable GPUs in the heterogeneous elements 222 of IT infrastructure 108 become available, the policy may recheck and find a new and possibly better way to deploy the given application workload or pieces or components thereof on the heterogeneous elements 222 of the IT infrastructure 108.

Policies may be obtained from various sources. Some policies may be user-defined, created by analyzing an application request, learned from other application workloads running on or previously run on the IT infrastructure 108 or one or more other infrastructures utilizing analytics module 604, etc. In some embodiments, certain policies may be obtained from external sources, or may be created by analyzing information from external sources. Examples of such external sources include Docker Compose, Cloud Foundry® and Symmetric VMAX® Fully Automated Storage Tiering (FAST). Embodiments, however, are not limited to use of these specific external sources. Various other types of external sources may be used in other embodiments. Information from external sources may be used to create new policies, or possibly to augment or modify existing policies.

Analytics module 604 provides learning and analytics functionalities. The analytics module 604 may operate runtime learning and analytics so as to update the local repository 307 of hardware configuration templates. The updates to local repository 307 may be based on observed runtime behavior, analysis or pattern detection over a large set of application classes and workloads.

Templates in the global repository 305 and/or the local repository 307 may describe the hardware elements or components of a hardware configuration as well as linkages between such components. The templates thus facilitate the creation of a directed graph associated with the deployment or orchestration of the components. Network information such as ports, names used in software defined networking (SDN), specific interfaces or subnets, etc. may be defined. Similar to the policies described above, some of this information may be obtained from or created by analyzing information from external sources including but not limited to tools such as Docker Compose and Cloud Foundry®.

Templates may also contain information relating to operating parameters for a hardware configuration. The operating parameters may include telemetry data that will be collected, monitored and analyzed to determine if and when one or more service level agreements (SLAs) or SLOs for an application will be breached. The range or degree of the breach may be used as a factor in triggering certain actions, such as triggering one or more policies for switching an application workload between hardware configurations. Application classes may be used, in some embodiments, to determine the thresholds for triggering such policies, or the amount of resources to allocate for monitoring (e.g., on request, periodic, real-time, etc.). As an example, if an application class indicates that an application is important for a business or other entity, more resources may be devoted to monitoring that application's workloads or the thresholds used for determining a breach of an SLA or SLO may be finer grained relative to thresholds used for other applications that are considered less important.

HERE 102 is configured to permit the enhanced application request generated by the enhanced request generation module 120 to include multiple hardware configurations, such as a primary or preferred hardware configuration and one or more alternate hardware configurations such as a secondary hardware configuration, a tertiary hardware configuration, etc. Thus, the enhanced application requests generated as described above support built-in re-alignment functionality, whereby application workloads scheduled using an enhanced application request can operate on one of the alternate hardware configurations in the case of outcomes (2) or (3) described above with respect to FIG. 4. The application workload can thus be scheduled by scheduler 106 using the enhanced application request on an alternate hardware configuration. The enhanced application request may be re-submitted when previously unavailable resources originally preventing the primary or preferred hardware configuration from being scheduled subsequently become available, and switching or re-aligning the application workload still has value as measured by one or more policies.

The alignment functionality of HERE 102 may produce a primary recommendation that is rejected or unfulfilled as described above with respect to outcomes (2) and (3) in FIG. 4, due to either insufficient (in use, too much contention, etc.) or failed resources. HERE 102, via re-alignment module 602, can search the local repository 307 for another hardware configuration that matches the application workload specification generated by parsing and interpreting hardware-agnostic SLO expressions of the application request. The alternate recommendation may be submitted and provisioned by the scheduler 106 on IT infrastructure 108. The application workload is runtime monitored by HERE 102, and if the resources for the original or primary recommendation subsequently become available, HERE 102 has the option of re-submitting the original recommendation to the schedule 106 based on policy considerations such as the amount of workload time remaining, contention with other workloads, etc.

HERE 102 is also configured, via learning and analytics functions implemented by the analytics module 604, to monitor a large set of application classes and workload behavior, and to actively update the local repository 307 to a state closer to the needs of applications run to date, both newer and legacy. The local repository 307 can also be updated from an external source such as global repository 305, where the global repository 305 includes a more global set of hardware configuration templates collected across many and varying IT infrastructure such as converged infrastructure (CI) platforms. The local repository 307 may utilize the existing catalog 228 of the IT infrastructure 108 to accept only entries from the global repository 305 that align with the set of heterogeneous elements 222 present on the local platform of the IT infrastructure 108.

The runtime monitoring provided by analytics module 604 can track the behavior of numerous application workloads, such as a large sampling of different classes of applications and their corresponding workloads. An analysis function looks for trends in the results, and compares such trends with catalogued resources and existing repository entries in the local repository 307. New entries, such as new hardware configuration templates, may be added to the local repository 307 based on policies and strength of change with respect to existing repository entries.

An exemplary process for monitoring application workloads scheduled on heterogeneous elements of IT infrastructure 108 will now be described in more detail with reference to the flow diagram of FIG. 7. It is to be understood that this particular process is only an example, and that additional or alternative processes for monitoring application workloads can be carried out in other embodiments.

In this embodiment, the process includes steps 700 through 706. These steps are assumed to be performed by the processor 112 of HERE 102 utilizing the re-alignment module 602 and analytics module 604 of alignment and learning module 118. The process begins with step 700, selecting a given hardware configuration for a given application workload based on aligning an application workload specification template with a first hardware configuration template in a first repository comprising a plurality of hardware configuration templates. The application workload specification template is generated by parsing and interpreting hardware-agnostic SLO expressions of an application request. The local repository 307 is an example of the first repository. The given application workload is scheduled to run on IT infrastructure 108 in step 702 utilizing the given hardware configuration. The given hardware configuration comprises a first set of a plurality of heterogeneous elements of the IT infrastructure 108. The FIG. 5 process described above may be used for steps 700 and 702.

In step 704, the IT infrastructure 108 is monitored. The given hardware configuration for the given application is modified in step 706 based on aligning the application workload specification template with a second hardware configuration template in the first repository responsive to the monitoring in step 704. The modified hardware configuration comprises a second set of the plurality of heterogeneous elements of the information technology infrastructure.

In some embodiments, the second hardware configuration template corresponds to a preferred hardware configuration for the given application workload. The use of the term "preferred hardware configuration" in this context indicates that the second hardware configuration template may be preferred relative to the first hardware configuration template. For example, scheduling the given application workload to run on the IT infrastructure 108 in step 702 may occur at a given point in time wherein the IT infrastructure 108 has insufficient capacity, either total or available, to fulfill the application request utilizing the second hardware configuration template, e.g., a preferred hardware configuration for the given application workload in this example. Monitoring the IT infrastructure 108 in step 704 may thus comprise monitoring usage of the plurality of heterogeneous elements of the IT infrastructure 108 to identify a current available capacity of the IT infrastructure 108 and to determine whether the current available capacity of the IT infrastructure 108 is sufficient to fulfill the application request for the given application workload utilizing the preferred hardware configuration corresponding to the second hardware configuration template. It is important to note, however, that the second hardware configuration template is not necessarily an optimal or most preferred hardware configuration for the given application workload. One or more other hardware configuration templates, for example, may be considered preferred relative to the second hardware configuration template.

Moreover, while various embodiments described herein refer to switching a given application workload running on the IT infrastructure 108 to a more preferred hardware configuration utilizing re-alignment module 602, embodiments are not so limited. In some embodiments the re-alignment module 602 may switch an application workload running on IT infrastructure 108 to a less preferred hardware configuration. This may occur, for example, in response to determining that the IT infrastructure 108 is overloaded or in response to determining that one or more other application workloads more important than the given application workload need to be scheduled on the IT infrastructure 108. The given application workload may also be re-aligned to a less preferred hardware configuration in response to changes in the IT infrastructure 108, such as one or more of the heterogeneous elements 222 failing, going offline, being removed, etc.

Monitoring the IT infrastructure 108 in step 704 further includes, in some embodiments, monitoring available capacity of the IT infrastructure 108 to identify one or more additional heterogeneous elements added to the plurality of heterogeneous elements of the information technology infrastructure.

Modifying the given hardware configuration in step 706 may be responsive to determining that the modified hardware configuration satisfies one or more policies regarding scheduling application workloads to run on the IT infrastructure 108. The one or more policies regarding scheduling the one or more workloads may comprise at least one policy relating to modifying the given hardware configuration based on a remaining lifetime of the given application workload, at least one policy relating to modifying the given hardware configuration based on contention between the given application workload and other ones of a plurality of applications workloads scheduled to run on the IT infrastructure 108, etc.

Monitoring the IT infrastructure 108 in step 704 in some embodiments includes analyzing a plurality of application workloads running on the IT infrastructure 108. The plurality of application workloads may include the given application workload. The plurality of hardware configuration templates stored in the first repository may be adjusted responsive to analyzing the plurality of application workloads on IT infrastructure 108. As mentioned above, the local repository 307 is an example of the first repository. In some embodiments, adjusting the plurality of hardware configuration templates comprises at least one of adding one or more new hardware configuration templates to the first repository, modifying one or more existing hardware configuration templates in the first repository, and removing one or more existing hardware configuration templates from the first repository. The second hardware configuration template may be one of the new hardware configuration templates or one of the modified existing hardware configuration templates. The first hardware configuration template may be removed from the first repository, which causes or initiates step 706.

Monitoring the IT infrastructure 108 in step 704 may include adding one or more new hardware configuration templates to the first repository from a second repository of hardware configuration templates by filtering the second repository using a local platform catalog representing capabilities provided by the plurality of heterogeneous elements of the IT infrastructure 108. The second repository may be the global repository 305.

HERE 102, as described above, may automatically align application or workload requests with known configurations of heterogeneous hardware and fabric elements to supply corresponding detailed job descriptions to scheduler 106 in a CI system. HERE 102 may also provide, via the re-alignment module 602 and analytics module 604, run-time re-alignment and learning capabilities to deal with situations including but not limited to the unavailability of resources at the original time of recommendation for an application or workload request, adding to a recommendation repository knowledge base, etc. Thus, HERE 102 can provide for more efficient use of pooled resources of IT infrastructure 108 with corresponding improvements in system productivity.

The alignment functionality of HERE 102 provided by the alignment and learning module 118 may in some embodiments derive a hardware configuration for an application or workload from an experiential repository and application manifest such as the local repository 307. The application or workload is effectively aligned with a best hardware configuration within a pool of heterogeneous hardware elements of IT infrastructure 108 as a pre-runtime event. Re-alignment and learning provided by re-alignment module 602 and analytics module 604 may in some embodiments handle runtime events for recommendation exception cases and enhancements. HERE 102 can also provide for runtime-oriented and automated upgrade functionality, such as the suggestions of specific added and/or decommissioned platform hardware elements based on operation observations of applications or workloads scheduled on IT infrastructure 108.

Although various embodiments are described below with respect to generating upgrade recommendations for hardware elements of IT infrastructure, embodiments are not so limited. Generating upgrade recommendations for modifying elements of IT infrastructure 108 may include recommendations for upgrading any combination of hardware and software elements of IT infrastructure 108. By way of example, modifying software elements of IT infrastructure 108 may include or refer to software elements in various different layers of a stack, such as firmware, an operating system (OS), etc. Such recommendations for upgrading hardware and/or software elements of IT infrastructure 108 may be based in part on analysis of various key performance indicators (KPIs).

HERE 102 in some embodiments provides automated mechanisms for realizing increased and more effective utilization of heterogeneous elements (e.g., processors, memory and storage types, fabrics, etc.) for increasing or maximizing system-level productivity for application workloads running on IT infrastructure 108. In some embodiments, this is achieved via agile and optimal alignment of pooled resources with increasingly diverse applications and their associated workloads. Alignment functionality of HERE 102 provides element/topology recommendations for a requesting application and workload based on a configuration knowledge base and local element catalog. Re-alignment functionality of HERE 102 provides exception handling and improved opportunities, such as in handling situations in which recommended elements of IT infrastructure 108 are not available at the time of a request, or when better options or configurations for an application or workload become available over time. Learning functionality of HERE 102 provides analytics capabilities facilitating additions to knowledge bases used by HERE 102 over time based on experience. Upgrade functionality of HERE 102 provides observation of application and workload behavior over time to generate recommendations to an operator of IT infrastructure 108 for hardware upgrades. An operator of IT infrastructure 108 may refer to an owner, administrator or other user (or a device associated with such an owner, administrator or other user), that exercises control over the hardware elements forming IT infrastructure 108.

In some embodiments, an operator of IT infrastructure 108 may also or alternatively refer to an account team within an enterprise tasked with analyzing and/or implementing upgrade recommendations. In some embodiments, an account team may be notified via transmitting an upgrade recommendation to a cloud system, such as Salesforce®. The account team may utilize such a cloud system to view recommendations, schedule meetings to discuss upgrade options and implementation, etc. The account team, in some cases, may be notified of the upgrade recommendations before providing upgrade recommendations to a customer, or such that the account team can discuss upgrade options in a meeting with a customer.

Contemporary data centers may include particular hardware assets that are combined and managed to carry out both specific and variable tasks. While in many cases software assets can be remotely added and/or upgraded without physical platform modifications, the addition and/or upgrade of hardware components by its nature consists of physical modification, which may be labor intensive. As a result, the initial configuration of physical data center platforms as well as upgrades to physical data center platforms should be carefully planned against perceived use cases, as the physical data center platform may remain in place or static for significant periods of time.

The behavior and needs of data centers, such as IT infrastructure 108, can change over time. For example, new applications are installed or run on the IT infrastructure 108, and existing applications or workloads running on previously configured elements may be upgraded over time. Thus, over time, it is possible that applications and usage behavior may not be optimized with existing elements of the IT infrastructure 108. There may be no particular means or functionality in IT infrastructure 108 for automatically observing and aligning changing behavioral aspects with potentially more efficient elements not presently installed or otherwise associated with the IT infrastructure 108.

Alignment and learning mechanisms of HERE 102, as described above with respect to FIGS. 1-7, may be realized or facilitated through use of an experiential repository knowledge base whereby application requirements and related manifests are utilized to develop a recommendation output, such as a recommended hardware configuration, for an application request. This output may be combined with an original application request and/or manifest to produce a more enhanced and finer grained job statement utilized by scheduler 106 to schedule the application or workload on the IT infrastructure 108. The scheduler 106 processes the more detailed job statement against the heterogeneous set of hardware elements in the IT infrastructure 108.

In some embodiments, the alignment functionality of HERE 102 provides improved element to application or workload alignment and utilization while also minimizing development impact on the scheduler 106 and telemetry 226 and catalog 228 functions of the platform M&O layer 224. As described above, the platform M&O layer 224 may be implemented via OnRack® or RackHD'. While the alignment functionality of HERE 102 may, in some embodiments, facilitate meeting the individual SLOs of applications and workloads, the alignment functionality of HERE 102 may in other embodiments provide for increasing or maximizing the collective system-level productivity of applications and workloads running on IT infrastructure 108 rather than attempting to optimize individual application or workload performance. Optimizing performance may include minimizing cost in terms of execution time, energy or other resources consumed, etc.

Local repository 307, as discussed above, may in some embodiments provide an experiential knowledge base that is populated with configurations or templates aligned to particular known applications classes and workloads. Application inspection function 301 parses and interprets application requests to provide a view of the application request in a format similar to the entries or templates in the local repository 307. Scanning function 309 aligns the output of the application inspection function 301 with entries in the local repository 307. The scanning function 309 may use one or more policies and a best fit approach, as there may be unknown or missing attributes in the output of application inspection function 301. A match results in a recommendation that, together with the output of application inspection function 301, forms a detailed job request statement provided to scheduler 106 via combination function 311.

Knowledge bases may be "global" or "local." A global knowledge base, such as global repository 305, represents a combination of all conceived and learned configurations or templates using hardware and/or software elements. A local knowledge base, such as local repository 307, represents a version of the global knowledge base that is filtered by a local platform catalog or registry of IT infrastructure 108 to be appropriately representative of the usable and/or available capabilities and capacities of the particular elements that are part of or available in IT infrastructure 108.

The upgrade functionality of HERE 102, in some embodiments, applies the alignment functionality described above with respect to the local knowledge base to the global knowledge base, and keeps records of the recommendation differences between application of the alignment functionality to the global knowledge base with its complete overall candidate element set and topologies relative to application of the alignment functionality to the associated local knowledge base representing what the platform or IT infrastructure 108 can provide with its immediate set of available elements. As applications and related workloads are scheduled on the IT infrastructure 108, the record size grows and the upgrade functionality of HERE 102 can automatically perform trending analysis. For example, numerous instances of insufficient local element quantities or multiple situations where alternative element types/topologies would be more effective and efficient can result in the generation of an upgrade recommendation. Such upgrade recommendations may include reports that highlight the opportunities for improvement and quantify potential returns associated with modifying elements of the IT infrastructure 108 in accordance with one or more of the upgrade recommendations.

Figure 8:
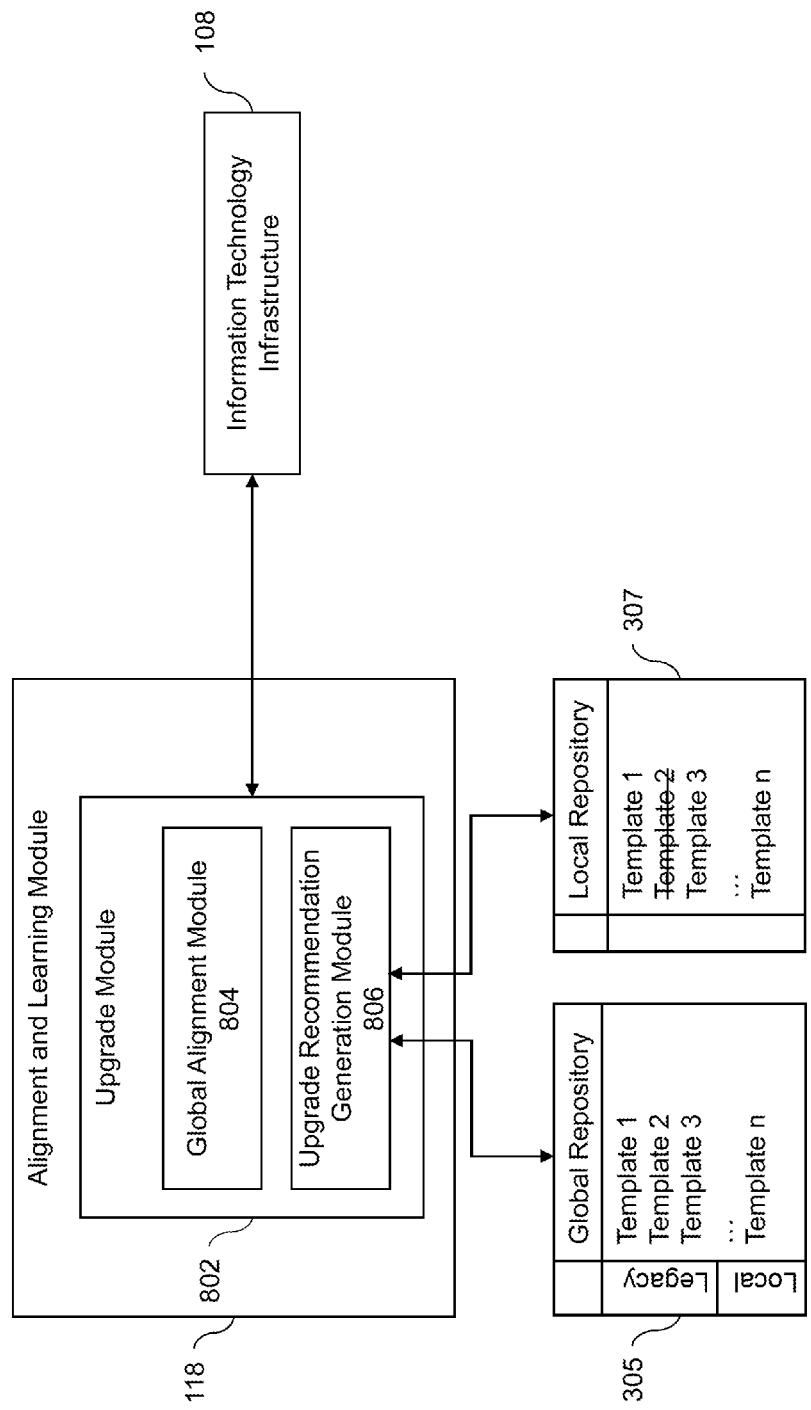
FIG. 8 is a detailed view of portions of the system shown and described in FIGS. 1-3 in an illustrative embodiment.

FIG. 8 shows a detailed view of portions of the system shown and described above with respect to FIGS. 1-3. As shown, alignment and learning module 118 includes an upgrade module 802, with the upgrade module 802 implementing a global alignment module 804 and an upgrade recommendation generation module 806. The global alignment module 804 provides alignment functionality in the context of global repository 305 rather than the local repository 307. As described above, the alignment and learning module 118 in fulfilling an application request may select a configuration template for a given application workload from a set of configuration templates in local repository 307. The local repository 307, as described above, may be obtained by filtering global repository 305 using a local platform catalog representing capabilities of the specific IT infrastructure 108 on which the application request is to be scheduled.

The global alignment module 804 may be used to select another configuration template from the global repository 305 to fulfill the application request. In some cases, the configuration template selected from the local repository 307 and the configuration template selected from the global repository 305 will be the same, e.g., such as situations in which the selected entry or template in the global repository 305 is also present in the local repository 307. In the FIG. 8 example, such a situation would be represented in a case wherein the template selected from the global repository 305 is Template 1 that is also present in the local repository 307.

In other cases, the configuration template selected from the local repository 307 may differ from the configuration template selected from the global repository 305, such as in situations wherein the selected entry or template in the global repository 305 is not present in the local repository 307. In the FIG. 8 example, such a situation would be represented in a case wherein the template selected from the global repository 305 is Template 2, which is filtered out of the local repository 307 (as illustrated by the strikethrough text shown in the FIG. 8 example). This situation may occur, for example, when the IT infrastructure 108 does not have the heterogeneous elements necessary to provision the configuration specified in Template 2. In some cases, this is due to unavailability of resources of the IT infrastructure 108, e.g., cases in which the resources for Template 2 are already in use by other application workloads running on the IT infrastructure 108. In other cases, the IT infrastructure 108 may not have the necessary elements for Template 2 altogether. The template selected from the local repository 307 would thus be a next-best template, such as Template 3, for generating the enhanced request in enhanced request generation module 120 as described elsewhere herein.

The upgrade module 802, through global alignment module 804, can keep track of the configuration templates selected from the global repository 305 as well as the configuration templates selected from the local repository 307 for application requests that are scheduled on IT infrastructure 108. Over time, differences between such selections may be used by upgrade recommendation generation module 806 to generate upgrade recommendations for modifying heterogeneous elements of the IT infrastructure 108. In the FIG. 8 example, if Template 2 is repeatedly selected from global repository 305, the upgrade recommendation generation module 806 may generate one or more upgrade recommendations to modify the elements of IT infrastructure 108 such that Template 2 is made available in the local repository 307.

The upgrade recommendations may be transmitted to an operator of the IT infrastructure 108. In some embodiments, this includes transmitting a notification to one or more other modules in HERE 102 and/or to applications 104, scheduler 106, IT infrastructure 108 or to a system administrator, IT manager or other authorized personnel via the above-described communication agents. This notification may include one or more of the upgrade recommendations themselves, or may simply notify the operator of the availability of the upgrade recommendations. The upgrade recommendations, in some embodiments, may include reports detailing the recommendations for upgrading IT infrastructure 108. Continuing with the above example, such a report may recommend that the IT infrastructure 108 be upgraded to include additional instances of or the necessary heterogeneous elements that are missing from Template 2, such that the local repository 307 can be updated and use Template 2 to improve performance of application workloads running on IT infrastructure 108.

Upgrade recommendation generation module 806, in addition to keeping track of differences in selected configuration templates between the global repository 305 and local repository 307, may further run analytics on the configuration templates selected from the local repository 307 itself. For example, if over time the upgrade recommendation generation module 806 discovers that a particular configuration template in the local repository 307 is not used or is used infrequently, the upgrade recommendation generation module 806 may generate an upgrade recommendation recommending that one or more heterogeneous elements of the IT infrastructure 108 be decommissioned. If implemented, such an upgrade recommendation may cause the local repository 307 to be updated to remove the unused or infrequently-used template. As another example, upgrade recommendations may be generated when the same configuration template is selected from local repository 307 for some threshold number of application workloads in a defined time period.

The upgrade recommendations generated by the upgrade recommendation generation module 806, as well as reports, notification or protocols included therein, may cause one or more actions to be taken automatically via one or more application programming interfaces (APIs) in HERE 102, applications 104, scheduler 106, IT infrastructure 108 or client devices of the system administrator, IT manager or other authorized personal implementing the communication agents. Such actions may include but are not limited to generating product purchase orders for new heterogeneous elements to be added to the IT infrastructure 108, scheduling installation of new heterogeneous elements to be added to the IT infrastructure 108, scheduling removal or decommissioning of heterogeneous elements to be removed from the IT infrastructure 108, triggering performance and/or operational expense (OPEX) analysis of recommendations to upgrade heterogeneous elements of the IT infrastructure 108 or to remove or decommission heterogeneous elements of the IT infrastructure 108, etc. For example, such a performance or OPEX analysis may indicate that the benefits to be obtained from adding a new element to the IT infrastructure 108 are outweighed by the costs of installing the new element, where such costs may result from the costs of hiring IT personnel to perform installation of new elements or removal of existing elements, costs of temporarily disrupting operation of at least a portion of the IT infrastructure 108 to allow for such installation or removal, etc.

Transmitting the upgrade recommendations generated by the upgrade recommendation generation module 806, in some embodiments, may initiate monitoring of the IT infrastructure 108 to identify modification of the heterogeneous elements included therein. The local repository 307 is updated responsive to identifying modification of the heterogeneous elements in the IT infrastructure 108. Such modification may include, for example, adding new hardware and/or software elements to the IT infrastructure 108, upgrading existing hardware and/or software elements of the IT infrastructure 108, removing existing hardware and/or software elements from the IT infrastructure 108, etc.

HERE 102 allows for scanning both the local repository 307 and global repository 305 for recommended topologies or configurations for an application request. Results from the local repository 307, which are used to fulfill the application request using enhanced request generation module 120 and scheduler 106, may be compared with results from the global repository 305 which potentially utilizes all known configurations and topologies rather than only those that are part of or available within IT infrastructure 108. Differences between such recommendations or selections can be recorded, tracked and analyzed for trends, such as significant efficiency gaps, in element usage of the IT infrastructure 108 over time.

Significant element efficiency gaps can result in the generation of upgrade recommendations, which may include detailed plans for modifying the elements of IT infrastructure 108 as well as reports detailing the projected improvements associated with such modifications. Reports may take various forms based on user selection. For example, the reports may provide projected improvements in the form of quantified performance gains, OPEX, etc.

A particular data center, such as IT infrastructure 108, may operate in a mode where there are both fixed and variable usage models. Fixed usage models, for example, may include appliances, while variable usage models include changing client application development and execution. The physical platform of IT infrastructure 108 may be initially designed, selected and installed based on predicted modeling of known use cases. The IT infrastructure 108 can operate, via an automated and agile M&O stack such as platform M&O layer 224, to utilize HERE 102 for application-heterogeneous hardware alignment based on a local recommendation repository such as local repository 307. The local repository 307 may be derived by filtering a global knowledge base such as global repository 305 of all known elements types and topologies with the local platform element catalog of the IT infrastructure 108. As applications and workloads arrive for scheduling and dispatching to the existing platform of IT infrastructure 108, HERE 102 provides element/topology recommendations based on both the global repository 305 and local repository 307. While HERE 102 provides recommendations to enhanced request generation module 120 from the local repository 307, HERE 102 can also select corresponding entries or recommendations from global repository 305. Comparative trends between the selections from the global repository 305 and local repository 307 can be stored and analyzed over time.

Trending analysis can be provided from HERE 102 to data center operators in the form of upgrade recommendations. Upgrade recommendations, in addition to providing detailed plans and blueprints for modifying the elements of IT infrastructure 108, may include numeric and/or graphical reports detailing projected returns associated with the proposed modification of elements of IT infrastructure 108 in the upgrade recommendations. Modifications in the elements of IT infrastructure 108 may include selected hardware and/or software element additions, upgrades and/or de-commissions. The recommendations may be based on selected efficiency criteria including performance and OPEX.

An exemplary process for generating upgrade recommendations for modifying heterogeneous elements of IT infrastructure 108 will now be described in more detail with reference to the flow diagram of FIG. 9. It is to be understood that this particular process is only an example, and that additional or alternative processes for generating upgrade recommendations can be carried out in other embodiments.

In this embodiment, the process includes steps 900 through 906. These steps are assumed to be performed by the processor 112 of HERE 102 utilizing the upgrade module 802 of alignment and learning module 118. The process begins with step 900, where a first configuration template and a second configuration template are selected for each of a plurality of application workloads. The first configuration template is selected based on aligning an application workload specification template with one of a first plurality of configuration templates in a first repository, such as local repository 307. The second configuration template is selected based on aligning the application workload specification template with one of a second plurality of configuration templates in a second repository, such as global repository 305. The first repository is obtained by filtering the second repository using a local platform catalog representing capabilities provided by a plurality of heterogeneous elements of information technology infrastructure 108. In some embodiments, step 900 includes generating the application workload specification templates for each of the plurality of application workloads by parsing and interpreting hardware-agnostic service level objective expressions of corresponding application requests.

In step 902, the application workloads are scheduled to run on the IT infrastructure 108 utilizing respective ones of the selected first configuration templates, where each of the first configuration templates comprises a set of the plurality of heterogeneous elements of the information technology infrastructure 108. The FIG. 5 process, for example, may be used to schedule the application workloads utilizing enhanced request generation module 120 and scheduler 106.

Figure 9:
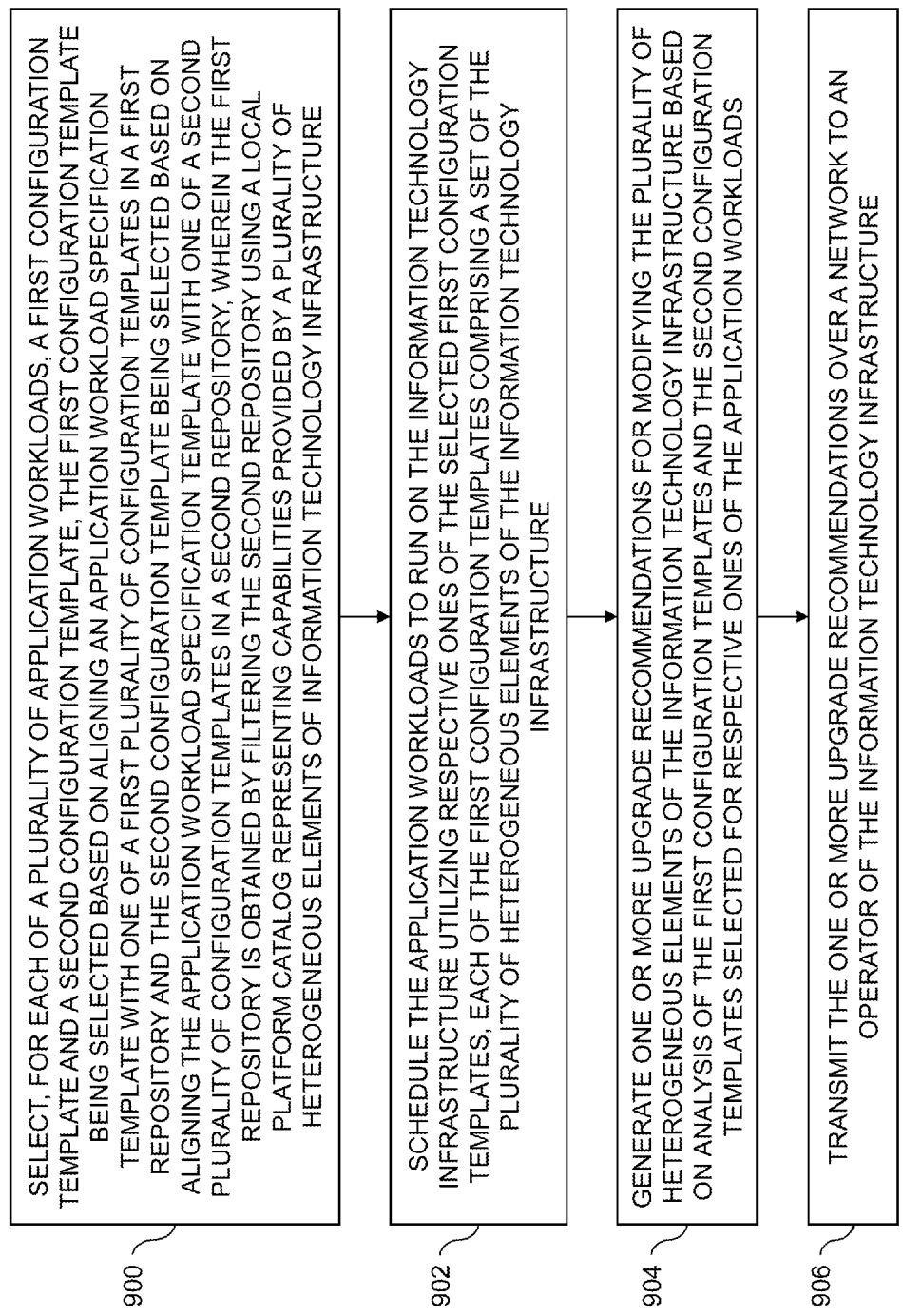
FIG. 9 is a flow diagram illustrating upgrade functions of a recommendation engine in an illustrative embodiment.

The FIG. 9 process continues with step 904, generating one or more upgrade recommendations for modifying the plurality of heterogeneous elements of the IT infrastructure 108 based on analysis of the first configuration templates and the second configuration templates selected for respective ones of the application workloads.

The second repository, such as global repository 305, may include one or more configuration templates that are not in the first repository or local repository 307. As discussed above, in the FIG. 8 example the global repository 305 includes a given configuration template (e.g., Template 2) not in the local repository 307. At least one of the upgrade recommendations may include a recommendation for upgrading elements of the IT infrastructure 108 so as to add one or more new elements to the IT infrastructure 108 such that the first repository or local repository 307 includes the given configuration template (e.g., Template 2).

In some embodiments, at least one of the upgrade recommendations comprises a recommendation to add additional instances of one or more of the plurality of heterogeneous elements of the IT infrastructure 108 that are part of at least one frequently-used one of the configuration templates in the first repository. The frequently-used one of the configuration templates may comprise a configuration template that is selected for a designated threshold of application workloads in a defined time period. For example, if a particular template in local repository 307 is selected for more than x workloads in a time period $t_1$, or for more than a percentage $p_1$ of workloads in the time period $t_1$, the recommendation may be to upgrade the IT infrastructure 108 such that additional instances of a configuration corresponding to that particular template may be run at the same time.

In some embodiments, at least one of the upgrade recommendations comprises a recommendation for decommissioning elements of the IT infrastructure 108. For example, the recommendation for decommissioning elements of the IT infrastructure 108 may comprise a recommendation to remove elements of a given element type, or one or more instances of elements of the given element type, from the IT infrastructure 108. The given element type may be part of at least one infrequently-used one of the configuration templates in the first repository. The infrequently-used one of the configuration templates may comprise a configuration template that is not selected for a designated threshold of application workloads in a defined time period. For example, if a particular template in local repository 307 is not selected for at least y workloads in a time period $t_2$, or for less than a percentage $p_2$ of workloads in the time period $t_2$, the recommendation may be to decommission or remove the elements of IT infrastructure 108 that are used for that template. In some embodiments, this may include removing all instances of the elements used in the infrequently-used template. In other embodiments, this may include removing some but not all of the instances of the elements used in the infrequently-used template.

One or more of the upgrade recommendations generated in step 904, in some embodiments, may include a report comprising a projected return from modifying the plurality of heterogeneous elements of the IT infrastructure 108 in accordance with one or more of the upgrade recommendations. The projected return may specify quantified performance gains for one or more application workloads running on the IT infrastructure 108, quantified changes in operational expenses for operating the IT infrastructure 108, etc.

In some embodiments, the analysis of step 904 may include tracking differences between the first configuration templates and the second configuration templates selected for respective ones of the plurality of application workloads over a defined time period. The upgrade recommendations for modifying the plurality of heterogeneous elements of the IT infrastructure 108 may be generated in step 904 responsive to identifying a threshold number of differences between the first configuration templates and the second configuration templates selected for respective ones of the plurality of applications workloads over the defined time period. For example, an upgrade recommendation may be generated on detecting more than z differences between the first configuration templates and the second configuration templates in a time period $t_3$, or on detecting that more than a percentage $p_3$ of the first configuration templates and the second configuration templates selected in step 900 are different for time period $t_3$.

The FIG. 9 process continues with step 906, transmitting the one or more upgrade recommendations over a network to an operator of the IT infrastructure 108. The plurality of heterogeneous elements of the IT infrastructure 108 may then be modified in accordance with at least one of the upgrade recommendations. In some embodiments, step 906 also includes monitoring the IT infrastructure 108 to identify modification of the plurality of heterogeneous elements of the IT infrastructure 108, such as in response to implementing one or more of the upgrade recommendations. The first repository, for example local repository 307, may be updated responsive to identifying modification of the plurality of heterogeneous elements of the IT infrastructure 108 such as those resulting from implementation of one or more of the upgrade recommendations. Modification of the plurality of heterogeneous elements of the IT infrastructure 108 may comprise one or more of adding one or more new hardware and/or software elements to the IT infrastructure 108, upgrading one or more existing hardware and/or software elements in the IT infrastructure 108, and removing one or more existing hardware and/or software elements in the IT infrastructure 108.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network systems, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   selecting, for each of a plurality of application workloads, a first configuration template and a second configuration template, the first configuration template being selected based on aligning an application workload specification template with one of a first plurality of configuration templates in a first repository and the second configuration template being selected based on aligning the application workload specification template with one of a second plurality of configuration templates in a second repository, wherein the first repository is obtained by filtering the second repository using a local platform catalog representing capabilities provided by a plurality of heterogeneous elements of information technology infrastructure;
   scheduling the application workloads to run on the information technology infrastructure utilizing respective ones of the selected first configuration templates, each of the first configuration templates comprising a set of the plurality of heterogeneous elements of the information technology infrastructure;
   generating one or more upgrade recommendations for modifying the plurality of heterogeneous elements of the information technology infrastructure based on analysis of the first configuration templates and the second configuration templates selected for respective ones of the application workloads; and
   transmitting the one or more upgrade recommendations over a network to an operator of the information technology infrastructure;
   wherein the plurality of heterogeneous elements of the information technology infrastructure are modified in accordance with at least one of the upgrade recommendations; and
   wherein the method is performed by at least one processing device comprising a processor coupled to a memory.

2. The method of claim 1 further comprising:
monitoring the information technology infrastructure to identify modification of the plurality of heterogeneous elements of the information technology infrastructure; and
updating the first repository of configuration templates responsive to identifying modification of the plurality of heterogeneous elements of the information technology infrastructure.

3. The method of claim 2 wherein modification of the plurality of heterogeneous elements of the information technology infrastructure comprises at least one of:
adding a new hardware element to the information technology infrastructure;
upgrading an existing hardware element in the information technology infrastructure; and
removing an existing hardware element in the information technology infrastructure.

4. The method of claim 2 wherein modification of the plurality of heterogeneous elements of the information technology infrastructure comprises at least one of:
adding a new software element to the information technology infrastructure;
upgrading an existing software element in the information technology infrastructure; and
removing an existing software element in the information technology infrastructure.

5. The method of claim 1 further comprising generating the application workload specification template by parsing and interpreting hardware-agnostic service level objective expressions of a corresponding application request.

6. The method of claim 1 wherein the second repository comprises a given configuration template not in the first repository, and wherein at least one of the upgrade recommendations comprises a recommendation for upgrading elements of the information technology infrastructure to add one or more new elements to the information technology infrastructure such that the first repository includes the given configuration template.

7. The method of claim 1 wherein at least one of the upgrade recommendations comprises a recommendation to add additional instances of one or more of the plurality of heterogeneous elements of the information technology infrastructure that are part of at least one frequently-used one of the configuration templates in the first repository, wherein the frequently-used one of the configuration templates in the first repository comprises a configuration template that is selected for a designated threshold of application workloads in a defined time period.

8. The method of claim 1 wherein at least one of the upgrade recommendations comprises a recommendation to decommission one or more existing elements of the information technology infrastructure.

9. The method of claim 8 wherein said at least one upgrade recommendation for decommissioning hardware elements of the information technology infrastructure comprises removing elements of a given element type from the information technology infrastructure, the given element type being part of at least one infrequently-used one of the configuration templates in the first repository, wherein the infrequently-used one of the configuration templates in the first repository comprises a configuration template that is not selected for a designated threshold of application workloads in a defined time period.

10. The method of claim 8 wherein said at least one upgrade recommendation for decommissioning hardware elements of the information technology infrastructure comprises removing one or more instances of a given element type from the information technology infrastructure, the given element type being part of at least one infrequently-used one of the configuration templates in the first repository, wherein the infrequently-used one of the configuration templates in the first repository comprises a configuration template that is not selected for a designated threshold of application workloads in a defined time period.

11. The method of claim 1 wherein at least one of the upgrade recommendations comprises a projected return from modifying the plurality of heterogeneous elements of the information technology infrastructure in accordance with said at least one upgrade recommendation.

12. The method of claim 11 wherein the projected return specifies at least one of:
quantified performance gains for one or more application workloads running on the information technology infrastructure; and
quantified changes in operational expenses for operating the information technology infrastructure.

13. The method of claim 1 wherein the analysis of the selected first configuration templates and the selected second configuration templates comprises tracking, over a defined time period, differences between the first configuration templates and the second configuration templates selected for respective ones of the plurality of application workloads.

14. The method of claim 13 wherein generating the one or more upgrade recommendations for modifying the plurality of heterogeneous elements of the information technology infrastructure is responsive to identifying a threshold number of differences between the first configuration templates and the second configuration templates selected for respective ones of the plurality of applications workloads over the defined time period.

15. A computer program product comprising a non-transitory processor-readable storage medium having stored therein program code of one or more software programs, wherein the program code when executed by at least one processing device cause the at least one processing device:
to select, for each of a plurality of application workloads, a first configuration template and a second configuration template, the first configuration template being selected based on aligning an application workload specification template with one of a first plurality of configuration templates in a first repository and the second configuration template being selected based on aligning the application workload specification template with one of a second plurality of configuration templates in a second repository, wherein the first repository is obtained by filtering the second repository using a local platform catalog representing capabilities provided by a plurality of heterogeneous elements of information technology infrastructure;
to schedule the application workloads to run on the information technology infrastructure utilizing respective ones of the selected first configuration templates, each of the first configuration templates comprising a set of the plurality of heterogeneous elements of the information technology infrastructure;
to generate one or more upgrade recommendations for modifying the plurality of heterogeneous elements of the information technology infrastructure based on analysis of the first configuration templates and the second configuration templates selected for respective ones of the application workloads; and to transmit the one or more upgrade recommendations over a network to an operator of the information technology infrastructure;

wherein the plurality of heterogeneous elements of the information technology infrastructure are modified in accordance with at least one of the upgrade recommendations.

16. The computer program product of claim 15 wherein the program code when executed further causes the at least one processing device:

to monitor the information technology infrastructure to identify modification of the plurality of heterogeneous elements of the information technology infrastructure; and to update the first repository of configuration templates responsive to identifying modification of the plurality of heterogeneous elements of the information technology infrastructure.

17. The computer program product of claim 16 wherein modification of the plurality of heterogeneous elements of the information technology infrastructure comprises at least one of:

adding a new hardware or software element to the information technology infrastructure;

upgrading an existing hardware or software element in the information technology infrastructure; and removing an existing hardware or software element in the information technology infrastructure.

18. An apparatus comprising:

at least one processing device comprising a processor coupled to a memory;

the at least one processing device being configured:

to select, for each of a plurality of application workloads, a first configuration template and a second configuration template, the first configuration template being selected based on aligning an application workload specification template with one of a first plurality of configuration templates in a first repository and the second configuration template being selected based on aligning the application workload specification template with one of a second plurality of configuration templates in a second repository, wherein the first repository is obtained by filtering the second repository using a local platform catalog representing capabilities provided by a plurality of heterogeneous elements of information technology infrastructure;

to schedule the application workloads to run on the information technology infrastructure utilizing respective ones of the selected first configuration templates, each of the first configuration templates comprising a set of the plurality of heterogeneous elements of the information technology infrastructure;

to generate one or more upgrade recommendations for modifying the plurality of heterogeneous elements of the information technology infrastructure based on analysis of the first configuration templates and the second configuration templates selected for respective ones of the application workloads; and to transmit the one or more upgrade recommendations over a network to an operator of the information technology infrastructure;

wherein the plurality of heterogeneous elements of the information technology infrastructure are modified in accordance with at least one of the upgrade recommendations.

19. The apparatus of claim 18 wherein the at least one processing device is further configured:

to monitor the information technology infrastructure to identify modification of the plurality of heterogeneous elements of the information technology infrastructure; and to update the first repository of configuration templates responsive to identifying modification of the plurality of heterogeneous elements of the information technology infrastructure.

20. The apparatus of claim 19 wherein modification of the plurality of heterogeneous elements of the information technology infrastructure comprises at least one of:

adding a new hardware or software element to the information technology infrastructure;

upgrading an existing hardware or software element in the information technology infrastructure; and removing an existing hardware or software element in the information technology infrastructure.

* * * * *